(12) United States Patent
Moran

(10) Patent No.: US 12,333,872 B2
(45) Date of Patent: Jun. 17, 2025

(54) VEHICLE CONTROL USAGE MONITORING

(71) Applicant: THE BOEING COMPANY, Chicago, IL (US)

(72) Inventor: Greg Moran, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 225 days.

(21) Appl. No.: 17/934,893

(22) Filed: Sep. 23, 2022

(65) Prior Publication Data

US 2024/0104978 A1   Mar. 28, 2024

(51) Int. Cl.
  *G07C 5/08*   (2006.01)
  *B64D 45/00*   (2006.01)
  *G07C 5/00*   (2006.01)

(52) U.S. Cl.
  CPC ............ *G07C 5/085* (2013.01); *B64D 45/00* (2013.01); *G07C 5/008* (2013.01); *B64D 2045/0065* (2013.01)

(58) Field of Classification Search
  None
  See application file for complete search history.

(56) References Cited

U.S. PATENT DOCUMENTS

| | | | |
|---|---|---|---|
| 6,397,128 B1 | 5/2002 | Todd | |
| 7,050,606 B2 | 5/2006 | Paul et al. | |
| 9,602,187 B2 | 3/2017 | Jacobs et al. | |
| 9,612,131 B2 | 4/2017 | Smailus et al. | |
| 10,348,787 B2 | 7/2019 | Nyikos et al. | |
| 10,710,457 B2 | 7/2020 | Thurimella | |
| 10,713,859 B1 | 7/2020 | McZeal | |
| 2007/0090972 A1 | 4/2007 | Monroe et al. | |
| 2014/0345396 A1* | 11/2014 | Riedel | B64D 45/00 73/865.4 |
| 2018/0312272 A1* | 11/2018 | Murugappan | H04N 7/18 |
| 2019/0356552 A1* | 11/2019 | Ricci | B60W 50/08 |
| 2022/0051029 A1* | 2/2022 | Cho | H04N 23/635 |
| 2023/0108953 A1* | 4/2023 | Kreiner | G05D 1/104 701/3 |
| 2023/0347903 A1* | 11/2023 | Katz | G06V 20/597 |

OTHER PUBLICATIONS

Wikipedia, "Kinect," https://en.wikipedia.org/w/index.php?title=Kinect&oldid=1093306875, last edited on Jun. 15, 2022, 31 pgs.
Wikipedia, Motion capture, https://en.wikipedia.org/w/index.php?title=Motion_capture&oldid=1083397049, last edited on Apr. 18, 2022, 15 pgs.

* cited by examiner

*Primary Examiner* — Lail A Kleinman
(74) *Attorney, Agent, or Firm* — Moore IP Law

(57) ABSTRACT

A method of monitoring controls of a vehicle includes receiving, at a computing device, sensor data from a ranging system. The ranging system monitors a space associated with one or more vehicle controls. The method also includes, in response to a determination by the computing device that one or more objects are introduced into the space based on analysis of the sensor data, causing the computing device to save state data to a first memory onboard the vehicle. The state data includes position data indicating a position of the one or more objects in the space.

20 Claims, 15 Drawing Sheets

VEHICLE CONTROL USAGE MONITORING

FIELD OF THE DISCLOSURE

The present disclosure is related to systems and methods for monitoring the use of vehicle controls.

BACKGROUND

A vehicle can include a data recorder to record information about the operation of the vehicle. The data recorder can record conditions of operation of the vehicle based on data received from sensors of the vehicle, selected operator input to the vehicle, or both. The data recorder can also record images (e.g., video or still images), audio, or both, in a vicinity of an operator or operators of the vehicle.

The vehicle can have a number of controls to facilitate operation of the vehicle. Some user input via the controls is recorded to the data recorder. For example, time data and a position, an amount of force, other information, or combinations thereof, for a control yoke of an aircraft is recorded by the data recorder. Other user input via the controls is not recorded to the data recorder. For example, user input via a dial that controls a brightness of background illumination for an instrument panel of the vehicle is not recorded by the data recorder for some vehicle implementations, even though the amount of illumination can be a factor that affects operation of the vehicle (e.g., in low light conditions, too little illumination can increase a time needed to identify a particular control and too much illumination can be a distraction).

Some agencies have proposed that the use of any control able to affect operation, navigation, or both, of a vehicle should be recorded. For example, ICAO Annex 6 Part I 6.3.4 from the International Civil Aviation Organization requires operator-machine interface recording of operation of any control which affects operation and navigation of an aircraft for new aircraft models with type certification application on or after 1 Jan. 2023. Use of a control by an operator of the aircraft can be based on parametric data (e.g., digital output on an electronic data bus from a control panel responsive to operator input), sensor data, image data from one or more cameras, or combinations thereof.

For some vehicles, some controls of the vehicle are not associated with sensors that enable a data recorder to record time data and position data associated with use of the controls. Providing such sensors for a vehicle can be problematic and expensive due to space considerations and redesign costs.

One way to identify use of controls of a vehicle is to record an operator of the vehicle using one or more cameras of a video system. Video recording an operator of a vehicle during an entire time of use of the vehicle can have a detrimental psychological effect on the operator. Some unions for particular vehicle operators have expressed opposition to subjecting operators of vehicles to video recording during use of vehicles. There is a need to identify use of controls of the vehicle without continuously recording the operator of the vehicle during use of the vehicle. Not continuously recording the operator can eliminate a source of mental stress for vehicle operators.

SUMMARY

According to one implementation of the present disclosure, a method of monitoring controls of a vehicle includes receiving, at a computing system, sensor data from a ranging system. The ranging system monitors a space associated with one or more vehicle controls. The method also includes causing the computing system to save first state data to a first memory onboard the vehicle. In response to a determination by the computing system that one or more objects are introduced into the space based on analysis of the sensor data, the first state data includes position data indicating a position of the one or more objects in the space.

According to another implementation of the present disclosure, a system to monitor vehicle controls of a vehicle includes a ranging system configured to monitor a space associated with one or more vehicle controls. The system includes one or more processors coupled to the ranging system to receive sensor data from the ranging system. The one or more processors are configured to generate first state data. In response to a determination by the one or more processors that one or more objects are introduced into the space based on analysis of the sensor data, the first state data includes position data that indicates a position of the one or more objects in the space. The system also includes a first memory configured to store the first data.

According to another implementation of the present disclosure, a vehicle includes vehicle controls. The vehicle includes a ranging system positioned in working relation to the vehicle controls. The ranging system monitors a space associated with the vehicle controls. The vehicle includes a computing system coupled to the ranging system to receive sensor data from the ranging system. The computing system is configured to generate first state data. In response to a determination by the computing system that one or more objects are introduced into the space based on analysis of the sensor data, the first state data includes position data that indicates a position of the one or more objects in the space. The vehicle also includes a first memory configured to store the first state data.

The features, functions, and advantages that have been described can be achieved independently in various implementations or may be combined in yet other implementations, further details of which are disclosed with reference to the following description and drawings. The drawings are conceptual and not drawn to scale.

DETAILED DESCRIPTION

Figure 1:
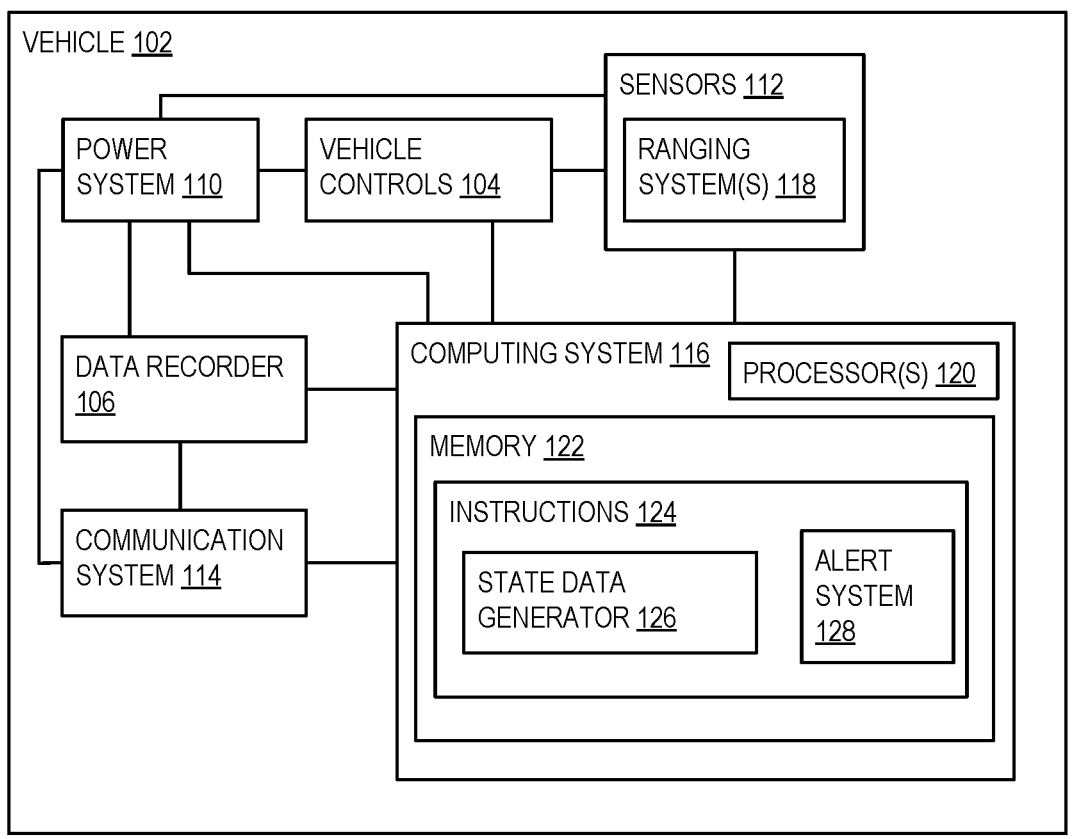
FIG. 1 is a block diagram of a system that enables monitoring of usage of vehicle controls of a vehicle and enables storage of state data during use of the vehicle to a data recorder onboard the vehicle, to an external data recording system, or both.

A vehicle can record state data during operation of the vehicle. The state data includes operating conditions of the vehicle (e.g., speed, location, heading, status of systems of the vehicle, detected anomalies (e.g., warnings and alerts), etc.), sensor output (e.g., remaining fuel, ambient temperature and pressure, temperature and pressure of engines, communication channel(s) in use by a communication system, etc.), vehicle control usage information, other information (e.g., audio data in a vicinity near an operator of the vehicle), or combinations thereof. The state data may be used to facilitate troubleshooting of operational events by enabling recreation of actions and states of the vehicle leading up to the operational events.

For some vehicles, state data is saved to a data recorder of the vehicle. In some implementations, the data recorder system is designed to survive extreme conditions (e.g., fire, heat, submersion, impact shock, etc.). For some vehicles, state data is saved in a buffer. The buffer is a data concentrator that retains a time window (e.g., 20 minutes, 30 minutes, or some other amount of time) of state data for the vehicle. In some implementations, the state data in the buffer is sent to a data recorder onboard the vehicle in response to detection of an event during operation of the vehicle. In other implementations, the state data in the buffer is transmitted by a communication system of the vehicle to an external data recording system in response to detection of an event. An event occurs when one or more conditions are satisfied. Satisfaction of the one or more conditions is based on operator request, an external request received via a communication system, presence of one or more particular alert conditions indicated by an alert system of the vehicle (e.g., failure of one or more engines, unsafe speed for current conditions, or other conditions based on sensor data that indicate conditions that can affect integrity of the vehicle), or other information. Some vehicles include a data recorder system and an ability to transmit state data when an event is detected, while other vehicles include a data recorder system without an ability to transmit state data for the vehicle or include an ability to transmit state data but do not include a data recorder in the vehicle.

A vehicle includes vehicle controls usable by an operator of the vehicle. Data corresponding to use of vehicle controls is stored as vehicle control use data (e.g., time data and position data) by a computing system of the vehicle as part of the state data for the vehicle. Use of vehicle controls is monitored by sensors. The sensors that monitor vehicle control usage include sensors coupled to first controls that provide data regarding use of the first controls to the computing system of the vehicle. Usage of a first control detected by the sensor coupled to the first control is a result of operator input to change the first control, a result of input from a control system that automatically changes the first control based on occurrence of one or more particular conditions, or both.

The sensors that monitor vehicle control usage also include one or more ranging systems. Each ranging system monitors a particular space (e.g., one or more particular instrument panels) that includes one or more second vehicle controls. The second vehicle controls can include one or more of the first vehicle controls as well as other vehicle controls of the vehicle. When an object (e.g., a portion of a hand of an operator) is moved into a space monitored by a ranging system, the ranging system provides sensor data to a computing system that enables recording of time data and position data associated with the object and particular vehicle controls while the object is in the space. The position data is video data, point cloud information descriptive of one or more boundaries of occupied volumes in the space (e.g., volumes occupied by the object, one or more of the particular controls, or both), other data, or combinations thereof. The position data can be viewed or analyzed to determine if the object interacted with one or more of the vehicle controls to change one or more vehicle controls of the particular controls while the object was in the space.

The use of ranging systems enables monitoring of use of select vehicle controls of the vehicle without providing individual sensors for each of the select vehicle controls of the vehicle. The use of ranging systems to monitor the select controls also enables tracking of vehicle control usage without having a video system that continuously monitors an operator of the vehicle during operation of the vehicle, which avoids adding stress of being constantly video monitored to an operator of the vehicle. In some implementations, the ranging systems are positioned and configured to provide data for a limited space that does not enable capture of facial characteristics and body characteristics of an operator of the vehicle.

The ranging systems monitor particular spaces that include the select vehicle controls. A ranging system is positioned in relation to a particular space so that the resolution of the ranging systems is more than sufficient to detect usage of the particular vehicle controls, as opposed to a video system that monitors a large area associated with an operator, which may not be able to provide sufficient resolution to identify particular vehicle controls used by the operator.

In some implementations, a single ranging system is positioned to monitor a plurality of vehicle controls. Monitoring a plurality of vehicle controls with a single ranging system eliminates a need for design, space, and expense associated with individual sensors for each vehicle control.

An amount of state data generated based on the ranging systems during operation of the vehicle is small as compared to the use of a video system that monitors an operator of the vehicle. In some implementations, vehicle controls that are frequently used during operation of the vehicle (e.g., a steering yoke and vehicle controls on the steering yoke, engine throttle levers, touch screens, etc.) are first controls that include individual sensors to monitor usage of the vehicle controls. Other vehicle controls that are not as frequently used during operation of the vehicle are arranged on one or more instrument panels positioned away from the frequently used vehicle controls. State data based on data from a ranging system is generated when an object is moved into a space monitored by the ranging system and continues to be generated until the object is removed from the space. The generation of such state data may occur infrequently and for short amounts of time, which can result in significantly less state data as compared to a video system that is continuously recording an area. Generation of significantly less state data reduces an amount of available storage needed on board a vehicle to save a time window of state data and reduces an amount of time needed to transmit the time window of state data from one location to another (e.g., from the vehicle to a data recording system that is not located aboard the vehicle).

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or arrangement of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram of a system 100 including a vehicle 102 that enables monitoring of usage of vehicle controls 104 of the vehicle 102 and storage of state data during use of the vehicle 102 to a data recorder 106 onboard the vehicle 102, to an external data recording system 108, or both. The vehicle 102 includes the vehicle controls 104, the data recorder 106, a power system 110, sensors 112, a communication system 114, and a computing system 116.

The vehicle 102 can be an aircraft (e.g., airplane, helicopter, autogyro, etc.), land vehicle (automobile, truck, train, etc.), marine vehicle (boat, submarine, etc.), space vehicle, or combinations thereof. Implementations and examples of vehicles 102 described herein will refer to aircraft, but the concepts are applicable to other types of vehicles 102. The vehicle 102 can be operated by an operator onboard the vehicle 102 or by an operator located remote from the vehicle 102.

The vehicle controls 104 enable an operator of the vehicle 102 to control the vehicle 102 and vehicle systems during use. The vehicle controls 104 include one or more steering controls, joy sticks, levers, rotatable selectors, knobs, dials, switches, slides, touch screens, other devices, or combinations thereof.

The data recorder 106 is a first memory onboard the vehicle 102 that records state data associated with operation of the vehicle 102. In some implementations, data recorders 106 save up to two hours of state data in a first memory based on sensor data from the sensors 112 before portions of the first memory are overwritten and up to 25 hours of audio data from one or more microphones in a control area (e.g., flight deck) of the vehicle 102 in a second portion of the memory before portions of the second memory are overwritten. In some implementations, the data recorder 106 is not a protected system designed to withstand extreme adverse conditions. In other implementations, the data recorder 106 meets particular standards to facilitate recovery and survivability of data recorded by the data recorder 106. When the vehicle 102 is an aircraft, the data recorder 106 is a flight recorder system, which is sometimes referred to as a "black box" of the aircraft.

The external data recording system 108 records, to memory located offboard of the vehicle 102, state data associated with operation of the vehicle 102. In some implementations, the external data recording system 108 is operated by an entity associated with a fleet of vehicles, by an entity that provides data storage services, or by another entity. The vehicle 102 is provided with addresses of one or more destination locations for the state data at the external data recording system 108 prior to use of the vehicle 102. In some implementations, the vehicle 102 does not have a capability to transmit state data to the external data recording system 108.

The power system 110 receives power from one or more engines, one or more battery systems, an external power source, or combinations thereof. The power system 110 supplies electricity to systems that require electrical power during operation of the vehicle 102. The vehicle 102 has an off state and an on state. In the off state, the power system 110 provides little or no power to systems of the vehicle 102. In the off state, some power can be supplied from battery systems of the power system 110 to maintain functionality of clocks, temporary lighting, alarm systems, etc. In the on state, the power system 110 provides power to one or more of the systems of the vehicle 102 to enable operation of the vehicle 102. The vehicle 102 is in the on state during startup of the vehicle 102 and when the vehicle 102 is capable of self-propelled movement.

The vehicle 102 includes a plurality of sensors 112. The sensors 112 monitor operating conditions associated with the vehicle 102 (e.g., location, speed, heading, outside temperature, etc.), vehicle conditions associated with operation of the vehicle 102 (e.g., engine conditions, hydraulic system conditions, passenger area and cargo area conditions, channel settings in use by the communication system 114, times of use of the communication system 114, positions of control devices and surfaces (e.g., slats and flaps of aircraft wings), etc.), usage of vehicle controls 104, sound in a control area (e.g., flight deck) of the vehicle 102, other conditions, or combinations thereof. Data from the sensors 112 is used to provide information to an operator of the vehicle 102 via one or more gauges, display monitors, haptic output devices, audio devices, etc. The sensors 112 provide sensor data to the computing system 116, to the data recorder (e.g., sound data from one or more microphones), to one or more gauges, or combinations thereof.

Particular sensors of the sensors 112 that monitor usage of the vehicle controls 104 include one or more ranging systems 118. A ranging system 118 is positioned in working relation to one or more of the vehicle controls 104 to be monitored by the ranging system 118. The ranging system 118 provides sensor data to the computing system 116 to enable the computing system 116 to determine a range to objects in a space monitored by the ranging system 118.

A ranging system 118 includes one or more emitters that emit signals (e.g., infrared light) into a space associated with the one or more vehicle controls 104 monitored by the ranging system 118, one or more detectors to receive returns of the signals emitted by the one or more emitters and provide sensor data to the computing system 116 based on the received signals, one or more cameras, or combinations thereof. In an implementation, the ranging systems 118 include Kinect systems available from Microsoft Corporation (Redmond, Washington). In other implementations, other types of ranging systems (e.g., lidar systems) are used.

A ranging system 118 provides sensor data to the computing system 116 for a space associated with one or more vehicle controls 104 monitored by the ranging system 118. The one or more vehicle controls 104 can be controls mounted in an instrument panel. The one or more detectors of the ranging system 118 provide range data corresponding to ranges to surfaces of objects in a vicinity of the ranging system 118 to the computing system 116. The objects include surfaces of the vehicle 102, surfaces of one or more vehicle controls 104, surfaces of portions of an operator or objects held by an operator, or other surfaces. The range data is analyzed by the computing system 116 to determine if an object (e.g., a hand or portion of a hand such as a thumb or finger) is introduced into a space associated with one or more vehicle controls 104 monitored by the ranging system 118. The space extends from the one or more vehicle controls 104 monitored by the ranging system 118 to an offset distance (e.g., 0.5 cm, 1 cm, 2 cm, 5 cm, or some other distance) away from the one or more vehicle controls 104 monitored by the ranging system 118. When the object enters the space, the computing system 116 receives and stores sensor data (e.g., time data, point cloud data, video data, or combinations thereof) during a time frame while the object remains in the space. The sensor data can be subsequently viewed, analyzed, or both, to determine if the object changed a position of one or more of the vehicle controls 104 monitored by the ranging system 118. When no object is in the space monitored by the ranging system 118, the computing system 116 does not store the sensor data from the ranging system 118.

In some implementations, the sensor data from a ranging system 118 includes point cloud data usable by the computing system 116 to define boundaries of one or more vehicle controls 104 in the space monitored by the ranging system 118, to define boundaries of one or more objects (e.g., one or more fingers or a thumb of an operator) in the space, or both. The computing system 116 also stores time data associated with receipt of the point cloud data. The time data and the point cloud data enable subsequent generation of a representation of the space for a time period associated with the time data, including movement of the object in the space and movement of vehicle controls 104 monitored by the ranging system 118 during the time period. In some embodiments, the point cloud data from a ranging system 118 that monitors a space is used in conjunction with image data of the space to monitor use of one or more of the vehicle controls 104 in the space.

In other implementations, the range data received by the computing system 116 from the ranging system 118 is used to determine when an object enters the space and when an object is removed from the space. In response to an object entering the space, the computing system 116 sends a start signal to the ranging system 118 to activate one or more cameras of the ranging system 118 to take video data of the space and send the video data to the computing system 116 as sensor data along with the range data. In response to removal of the object from the space, the computing system sends a stop signal to the ranging system 118 to stop the one or more cameras of the ranging system 118 from taking the video data. The video data can include a time stamp and be saved as a portion of state data for the vehicle 102. The video data can be subsequently viewed to determine whether the object in the space changed a position of one or more vehicle controls 104 in the space monitored by the ranging system 118.

In some implementations, the ranging systems 118 are operable to provide sensor data to the computing system 116 before the vehicle 102 is capable of self-propelled movement of the on state. For example, during a startup procedure of the vehicle 102 before engines of the vehicle 102 are started, the power system 110 provides power (e.g., power from an external power source coupled to the vehicle 102, power from a battery system, etc.) to the computing system 116 and the ranging systems 118 so that the ranging systems 118 provide sensor data to the computing system 116 to enable monitoring of use of one or more of the vehicle controls 104 during the startup procedure.

The communication system 114 provides the vehicle 102 and operators of the vehicle 102 with a capability to communicate with sources external to the vehicle 102. The communication system 114 can transmit and receive voice data and other types of data.

The computing system 116 facilitates operation of the vehicle 102. The computing system 116 includes one or more processors 120 and a memory 122. The memory 122 stores sensor data from the sensors 112, data derived from the sensors 112, other data associated with the vehicle 102, and combinations thereof. The memory 122 also stores instructions 124 executable by the one or more processors 120 to perform operations. In some implementations, the instructions 124 are organized in units (e.g., programs and subprograms) that perform particular tasks and operations. For the implementation depicted in FIG. 1, the units include a state data generator 126 and an alert system 128.

The state data generator 126 receives sensor data from the sensors 112 and generates, accesses, and organizes state data associated with operation of the vehicle 102. The state data includes information that is likely to indicate a cause or causes of specific conditions experienced by the vehicle 102 based on analysis of historical usage data of the same type of vehicle 102. In some implementations, the state data generator 126 crops data (e.g., video data or point cloud data) received from the one or more ranging systems 118, so that the remaining data for a particular ranging system corresponds to the space monitored by the particular ranging system. In some implementations, the state data generator 126 compresses all or a portion of the state data.

The alert system 128 determines if operating conditions, or trends of the operating conditions, of the vehicle 102 based on sensor data from the sensors 112 are within normal ranges for the operating conditions or trends. The alert system 128 generates notifications of operating conditions and trends that are out of normal ranges and generates notifications when operating conditions and trends return to normal ranges. A notification from the alert system 128 is presented to an operator of the vehicle 102 via one or more displays, via an audio signal, via haptic output (e.g., vibration of a steering yoke, seat, or both), via another output device, or combinations thereof. In some implementations, notifications provided by the alert system 128 during operation of the vehicle 102 are part of the state data provided to the data recorder 106, the external data recording system 108, or both.

During operation of the vehicle 102, the computing system 116 receives sensor data from the sensors 112. The one or more processors 120, via the state data generator 126, generate state data from the sensor data. The state data includes conditions associated with use of the vehicle 102 (e.g., speed, altitude, altitude change rate, location, heading, etc.); information determined from the sensors 112 (e.g., remaining fuel, one or more system temperatures, pressures, output levels, etc.); notifications generated by an alert system 128; vehicle control usage data (e.g., identification of a vehicle control 104, a time when the vehicle control 104 receives operator input, and an indication of change caused by the operator input; time data and point cloud data from a ranging system 118; time data and video data from a ranging system 118; etc.); sound data for one or more areas (e.g., a control area) of the vehicle 102 from one or more microphones; other information, or combinations thereof. The one or more processors 120 send the state data to the data recorder 106 for storage in the data recorder 106.

In FIG. 1, the data recorder 106 is depicted as a device that is distinct from the computing system 116. In some implementations, the data recorder 106 is a portion of the memory 122 of the computing system 116.

In some implementations, second state data is provided to the communication system 114 from the data recorder 106 or the computing system 116. The communication system 114 transmits the second state data to the external data recording system 108. In particular implementations, the content of the second state data is the same as the content of the state data provided to the data recorder 106. In other implementations, the content of the second state data is different than the content of the state data provided to the data recorder 106 (e.g., the content of the second state data is a subset of the content of the state data provided to the data recorder 106).

Figure 2:
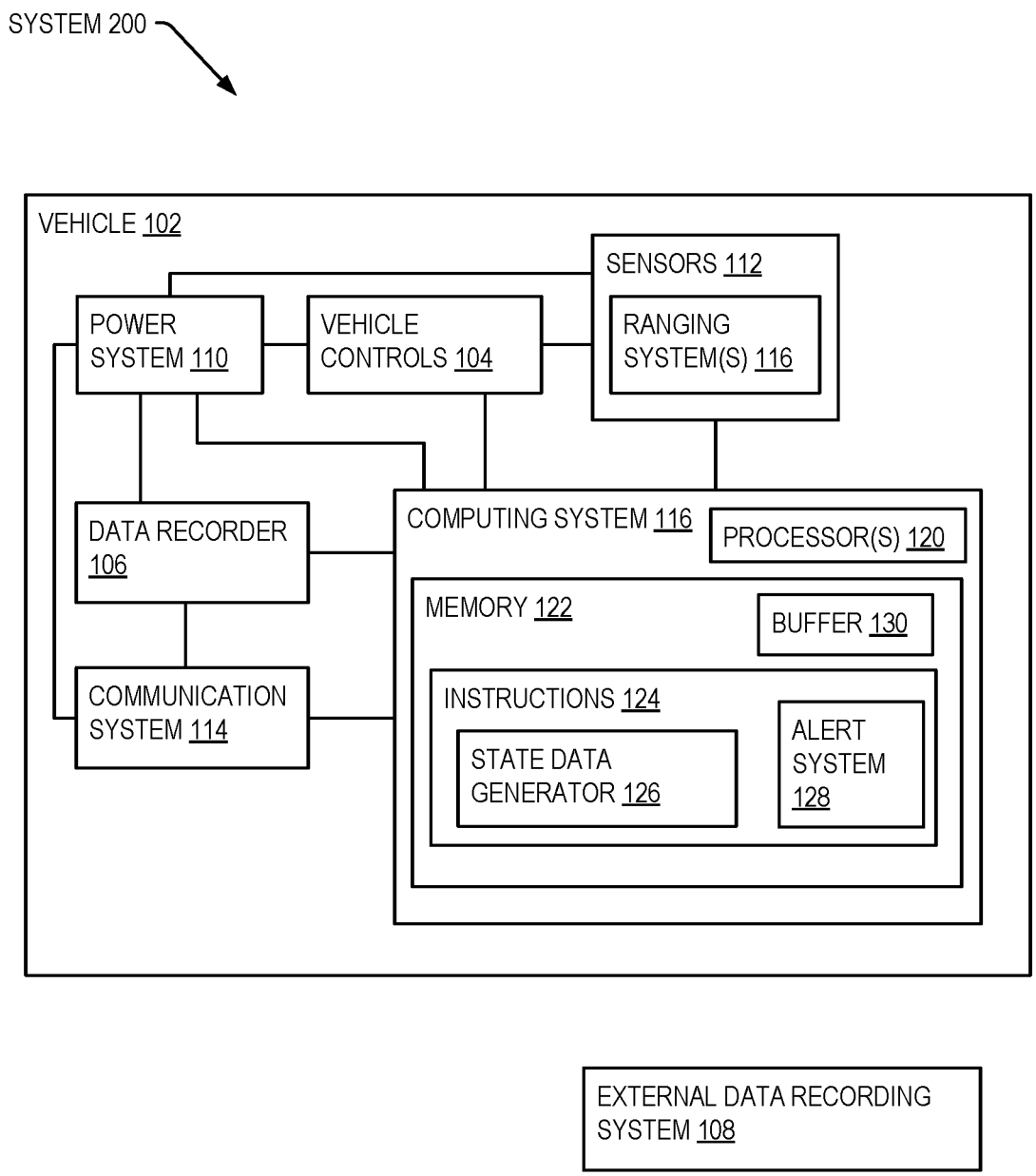
FIG. 2 is a block diagram of another system that enables monitoring of usage of vehicle controls of a vehicle and enables storage of state data during use of the vehicle to a data recorder onboard the vehicle, to an external data recording system, or both.

FIG. 2 is a block diagram of a system 200 including a vehicle 102 that enables monitoring of usage of vehicle controls 104 of the vehicle 102 and storage of state data during use of the vehicle 102 to a data recorder 106 onboard the vehicle 102, to an external data recording system 108, or both. The data recorder 106, the external data recording system 108, or both, periodically receives state data during operation of the vehicle 102.

The memory 122 of the computing system 116 of the vehicle 102 includes a buffer 130. During operation of the vehicle 102, the state data generator 126 produces state data and sends the state data to the buffer 130 to accumulate a time window of state data. The time window corresponds to 1 minute, 5 minutes, 10 minutes or some other time period of state data corresponding to operation of the vehicle 102. At particular time intervals, the one or more processors 120 dump the content of the buffer 130 to the data recorder 106 to save the content to the data recorder 106.

In some implementations of the system 200, the communication system 114 enables transmission of second state data to the external data recording system 108. The communication system 114 receives second state data from the data recorder 106, from the buffer 130 via the computing system 116, or both. The content of the second state data can be the same as, or different than, the content of the state data provided to the data recorder 106 from the buffer 130. The communication system 114 transmits the second state data to the external data recording system 108.

Figure 3:
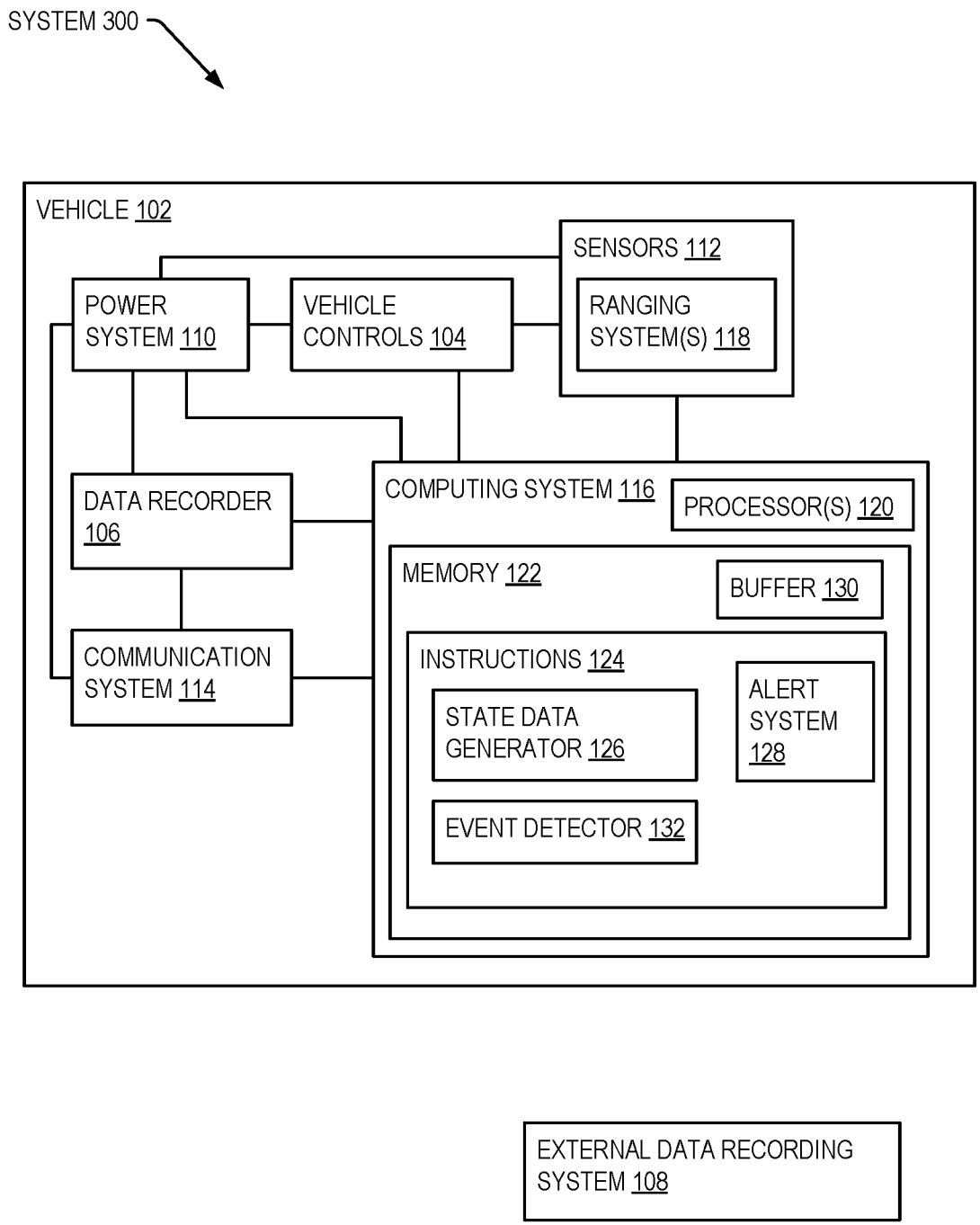
FIG. 3 is a block diagram of another system that enables monitoring of usage of vehicle controls of a vehicle and enables storage of state data during use of the vehicle to a data recorder onboard the vehicle, to an external data recording system, or both.

FIG. 3 is a block diagram of a system 300 including a vehicle 102 that enables monitoring of usage of vehicle controls 104 of the vehicle 102 and storage of state data during use of the vehicle 102 to a data recorder 106 onboard the vehicle 102, to an external data recording system 108, or both. The memory 122 of the computing system 116 includes a buffer 130 and the instructions 124 of the memory 122 include an event detector 132.

The buffer 130 stores a time window of state data corresponding to operation of the vehicle 102. During operation of the vehicle 102, the state data generator 126 produces and provides state data to the buffer 130. The state data sent to the buffer 130 is stored in a particular data structure of an array of data structures of the buffer 130. The size of the array corresponds to a time window of a desired time range of operation of the vehicle 102 (e.g., 10 minutes, 15 minutes, 30 minutes, or some other time range). The one or more processors 120 continue to generate state data and store the state data in the next data structure of the array. When the array is filled, next generated state data is written to the data structure corresponding to the oldest entry in the array to overwrite the oldest entry.

The event detector 132 determines a start of an event and an end of the event based on event data input. An event can indicate presence of one or more conditions that can adversely affect operation of the vehicle 102. The event detector 132 applies a plurality of rules and conditions to the event data input to determine whether an event starts or whether the event ends. The event data input enables the event detector 132 to determine there is an event based on operator input (e.g., a change in position of a particular switch from a first position to a second position or analysis of a voice command), based on first input received via the communication system 114 from an external source, based on weather conditions (e.g., an event occurs during rain, sleet, snow, or other adverse weather condition for some implementations), based on a particular phase of operation of the vehicle 102 (e.g., take-off, approach to landing, etc.), based on presence, as indicated by the alert system 128, of one or more critical alerts or other types of alerts that could affect operability of the vehicle 102 (e.g., engine failure, improper speed or glide slope during approach to landing, etc.), based on other conditions, or combinations thereof.

The one or more processors 120, via the event detector 132, determine that an event ends based on the event data input. The event data input that enables the event detector 132 to determine that an event ends includes operator input (e.g., a change of the position of the particular switch from the second position to the first position), current weather conditions, second input received via the communication system 114 from an external source, an end of a particular phase of operation of the vehicle 102, absence of the one or more alerts that initiated an event for a period of time (e.g., 10 seconds, 30 seconds, or some other period of time), the vehicle 102 changing from the on state to the off state, other conditions, or combinations thereof.

For a particular implementation of the system 300, the data recorder 106 is idle when the event detector 132 has not identified an event based on event data input. When the event detector 132 detects a start of an event, the event detector 132 causes the computing system 116 to send the state data content for the time window stored in the buffer 130 at a start of the event to the data recorder 106 for storage by the data recorder 106. The event detector 132 also causes newly generated state data produced by the state data generator 126 during the event to be sent, from the state data generator 126 or the buffer 130, to the data recorder 106 for storage by the data recorder 106 during the event. The state data content of the time window at the start of the event and newly generated state data are sent to the data recorder 106 as two different streams with identification information that indicates the particular stream to enable a time ordered reconstruction of the state data from the data stored by the data recorder 106. When the event detector 132 detects an end of the event based on the event data input, the event detector 132 stops the newly generated state data from being sent to the data recorder 106. If the end of the event occurs before all of the content of the time window is sent to the data recorder 106, the state data content for the time window continues to be sent to the data recorder 106 until all of the content for the time window is sent to the data recorder 106.

Should the event detector 132 detect a start of a second event during a first event, the event detector 132 does not cause the content of the buffer 130 to be sent to the data recorder 106 based on the start of the second event. When the vehicle 102 is concurrently experiencing a plurality of events, sending of current state data to the data recorder 106 continues until the event detector 132 determines based on event data input that each event of the plurality of events ended.

When the particular implementation of system 300 enables the communication system 114 to transmit state data to the external data recording system 108, the event detector 132, in response to detection of an event by the event detector 132 when there are no other concurrent events, causes second state data content for the time window stored in the buffer 130 at the time of the start of the event to be sent, from the computing system 116 or the data recorder 106, to the communication system 114 for transmittal to the external data recording system 108. The event detector 132 also causes newly generated second state data produced by the state data generator 126 during the event to be sent, from the computing system 116 or the data recorder 106, to the communication system 114 for transmittal to the external data recording system 108. The second state data sent to the communication system 114 can be the same as, or different than, the state data sent to the data recorder 106.

Should the event detector 132 detect a start of a second event during a first event, the event detector 132 does not cause the second state data content of the buffer 130 to be sent to the communication system 114 based on the start of the second event. When the vehicle 102 is concurrently experiencing a plurality of events, sending of newly generated second state data to the communication system 114 continues until the event detector 132 determines based on the event data input that each event of the plurality of events ended.

In another implementation of the system 300, the state data is continuously provided to the data recorder 106 during operation of the vehicle 102 from the state data generator 126 or the buffer 130. During an event or during a plurality of events, the event detector 132 causes the second state data content of the buffer 130 at the start of the event, or at the start of an earliest event of the plurality of events, to be sent to the communication system 114 for transmittal to the external data recording system 108 and causes currently generated second state data to be sent to the communication system 114 from the state data generator 126 or the buffer 130 for transmittal to the external data recording system 108 during the event or during the plurality of events.

Figure 4:
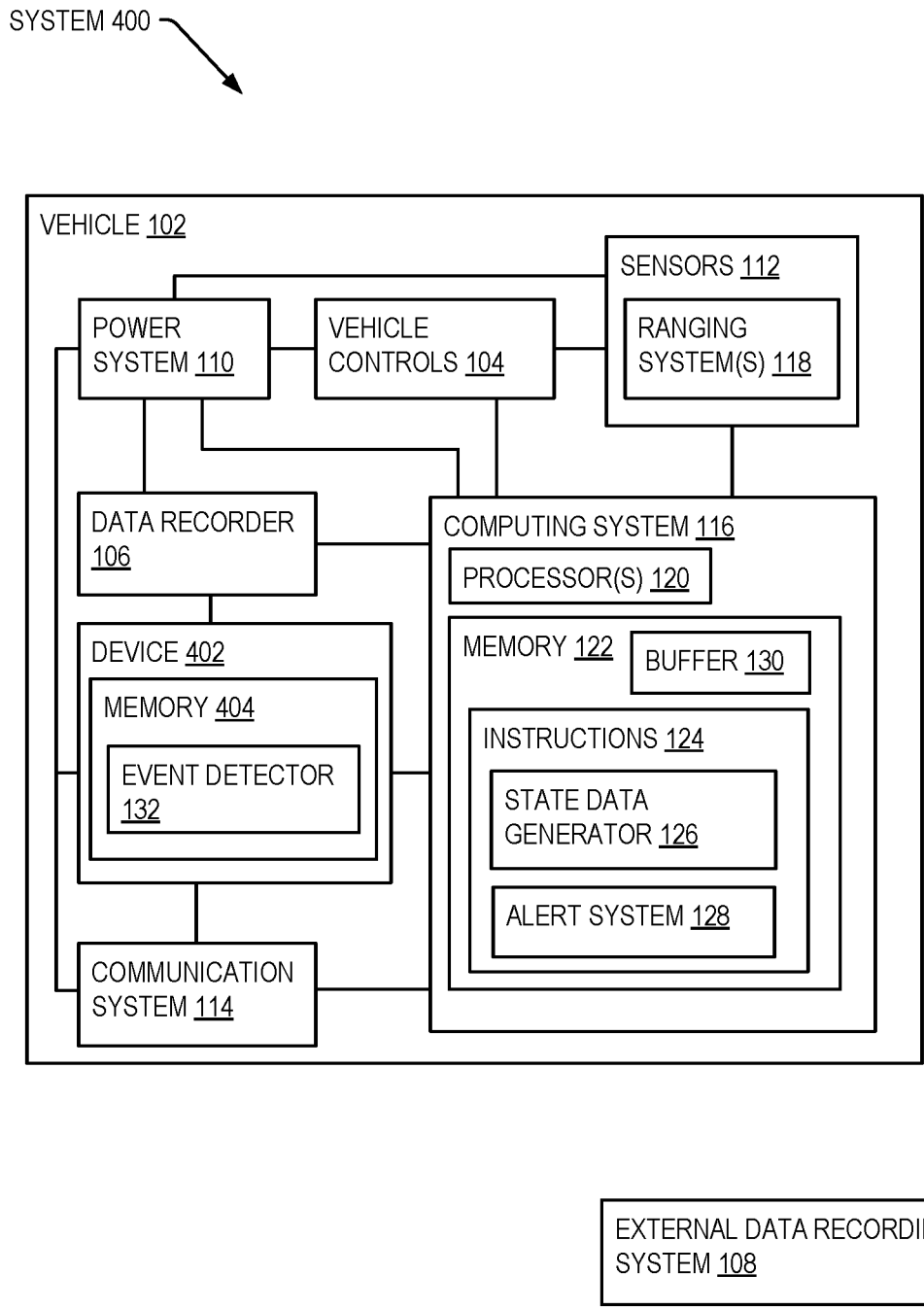
FIG. 4 is a block diagram of another system that enables monitoring of usage of vehicle controls of a vehicle and enables storage of state data during use of the vehicle to a data recorder onboard the vehicle, to an external data recording system, or both.

FIG. 4 is a block diagram of a system 400 including a vehicle 102 that enables monitoring of usage of vehicle controls 104 of the vehicle 102 and storage of state data during use of the vehicle 102 to a data recorder 106 onboard the vehicle 102, to an external data recording system 108, or both. The vehicle 102 includes a device 402 separate from a computing system 116 of the vehicle 102. The device 402 includes a memory 404. The memory 404 includes the event detector 132. The device 402 receives event data input from the computing system 116, a communication system 114 of the vehicle 102, other systems, or combinations thereof, that is used by the event detector 132 to determine a start of an event or an end of the event.

For a particular implementation of the system 400, the data recorder 106 is idle when the event detector 132 has not identified an event. During operation of the vehicle 102, state data produced by the state data generator 126 is sent to, and saved as a time window of state data in the buffer 130 of the computing system 116. When the event detector 132 detects a start of an event based on the event data input, the event detector 132 causes the state data content for the time window stored in the buffer 130 up to a start of the event to be sent to the data recorder 106 for storage by the data recorder 106. The event detector 132 also causes the computing system 116 to send newly generated state data produced by the state data generator to the data recorder 106 for storage by the data recorder 106 during the event. When the event detector 132 detects an end of the event, the event detector 132 causes the computing system 116 to stop sending the newly generated state data to the data recorder 106. If the end of the event occurs before all of the content of the time window up to the start of the event is sent to the data recorder 106, the state data content for the time window continues to be sent to the data recorder 106 until all of the content for the time window up to the start of the event is sent to the data recorder 106.

Should the event detector 132 detect a start of a second event during a first event, the event detector 132 does not cause the state data content of the buffer 130 to be sent to the data recorder 106 based on the start of the second event. When the vehicle 102 is concurrently experiencing a plurality of events, sending of newly generated state data to the data recorder 106 continues until the event detector 132 determines that all events of the plurality of events ended.

When the particular implementation of system 400 enables the communication system 114 to transmit state data to the external data recording system 108, the event detector 132, in response to detection of an event by the event detector 132 when there are no other concurrent events, causes second state data content for the time window stored in the buffer 130 up to the start of the event to be sent to the communication system 114 for transmittal to the external data recording system 108. The event detector 132 also causes newly generated second state data during the event to be sent to the communication system 114 for transmittal to the external data recording system 108. The second state data sent to the communication system 114 can be the same as, or different than, the state data sent to the data recorder 106.

Should the event detector 132 detect a start of a second event during a first event, the event detector 132 does not cause the second state data content of the buffer 130 to be sent to the communication system 114 based on the start of the second event. When the vehicle 102 is concurrently experiencing a plurality of events, sending of newly generated second state data to the communication system 114 continues until the event detector 132 determines that all events of plurality of events ended.

In another implementation of the system 400, the state data is continuously provided to the data recorder 106 during operation of the vehicle 102 from the state data generator 126 or the buffer 130. During an event or during a plurality of events, the event detector 132 causes the second state data content of the buffer 130 up to a start of the event, or a start of the earliest event of the plurality of events, to be sent to the communication system 114 for transmittal to the external data recording system 108 and causes currently generated second state data to be sent to the communication system 114 from the buffer 130 for transmittal to the external data recording system 108 until the event detector determines based on event data input that the event ended or that all events of the plurality of events ended.

Figure 5:
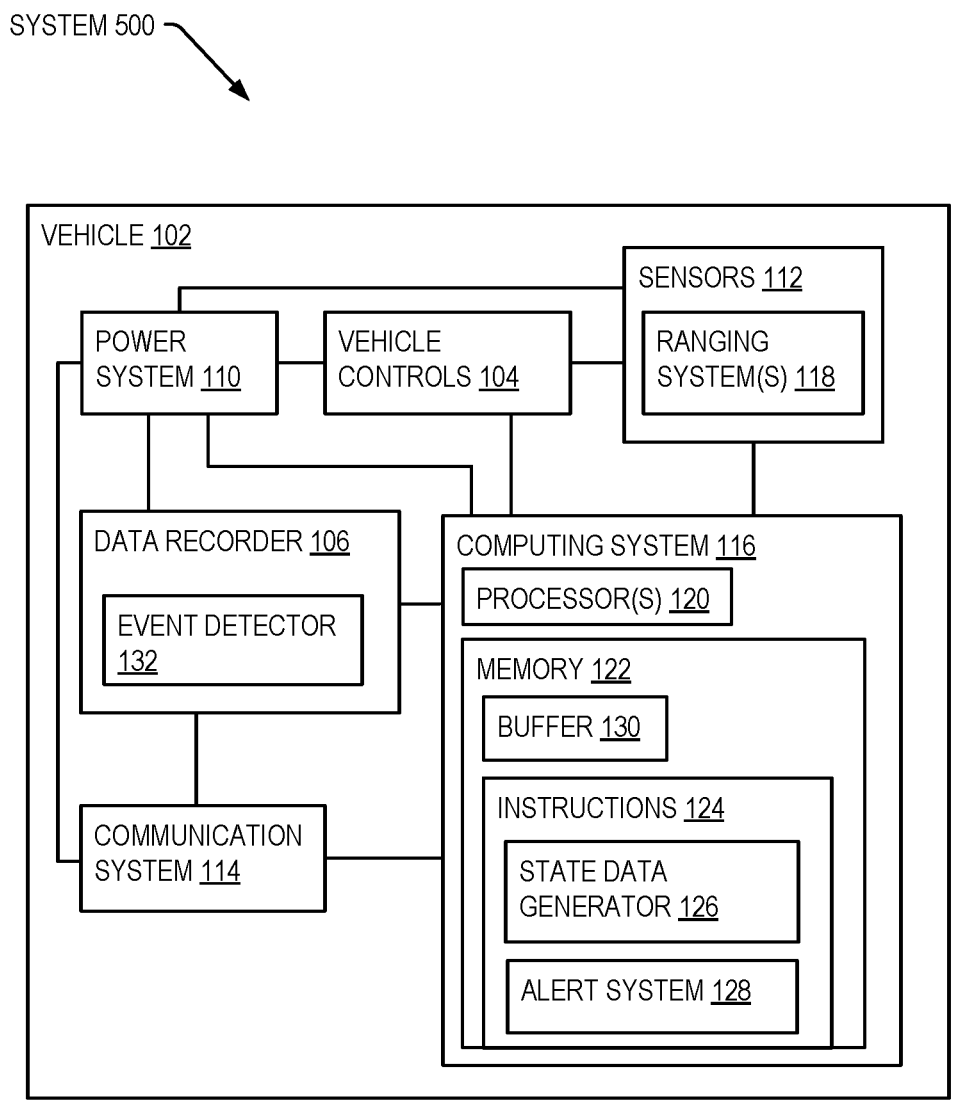
FIG. 5 is a block diagram of another system that enables monitoring of usage of vehicle controls of a vehicle and enables storage of state data during use of the vehicle to a data recorder onboard the vehicle, to an external data recording system, or both.

FIG. 5 is a block diagram of a system 500 including a vehicle 102 that enables monitoring of usage of vehicle controls 104 of the vehicle 102 and storage of state data during use of the vehicle 102 to a data recorder 106 onboard the vehicle 102, to an external data recording system 108, or both. The data recorder 106 includes an event detector 132 and receives event data input from a computing system 116 of the vehicle, from a communication system 114 of the vehicle 102, from other sources, or combinations thereof. The event data input enables the event detector 132 to determine a start of an event and an end of the event.

For a particular implementation of the system 500, the state data generator 126 sends state data associated with operation of the vehicle 102 to the buffer 130. The buffer 130 saves the state data as a time window of state data. When the event detector 132 detects a start of an event based on the event data input, the event detector 132 causes the data recorder 106 to retrieve and save state data content of the buffer 130 corresponding to the time window up to a start of the event. The event detector 132 also causes the data recorder to retrieve and store newly generated state data produced by the state data generator 126 during the event. When the event detector 132 detects an end of the event based on the event data input, the event detector 132 stops retrieval of the newly generated state data. If the end of the event occurs before all of the content of the time window up to the start of the event is retrieved, the data recorder 106 continues to retrieve the state data from the buffer 130 until all of the content for the time window is retrieved.

Should the event detector 132 detect a start of a second event during a first event, the event detector 132 does not cause retrieval of the state data content of the buffer 130 based on the start of the second event. When the vehicle 102 is concurrently experiencing a plurality of events, the newly generated state data is retrieved from the computing system 116 until the event detector 132 determines that all of the events of the plurality of events ended.

When the particular implementation of system 500 enables the communication system 114 to transmit state data to the external data recording system 108, the event detector 132, in response to detection of an event by the event detector 132 when there are no other concurrent events, causes the data recorder 106 to send second state data content for the time window up to the start of the event to the communication system 114 for transmittal to the external data recording system 108. The event detector 132 also causes newly generated second state data retrieved from the computing system 116 during the event to be sent to the communication system 114 for transmittal to the external data recording system 108. The second state data sent to the communication system 114 can be the same as, or different than, the state data sent to the data recorder 106.

In another implementation of the system 500, the state data is continuously provided to the data recorder 106 from the computing system 116 and recorded by the data recorder 106 during operation of the vehicle 102 from the computing system 116. During an event or during a plurality of events, the event detector 132 causes data recorder 106 to retrieve, and send to the communication system for transmittal to the external data recording system 108, the second state data content from the buffer 130 up to the start of the event or a start of an earliest event of the plurality of events. The event detector 132 also causes currently generated second state data received at the data recorder 106 to be sent during the event or the plurality of events to be sent to the communication system 114 for transmittal to the external data recording system 108.

Figure 6:
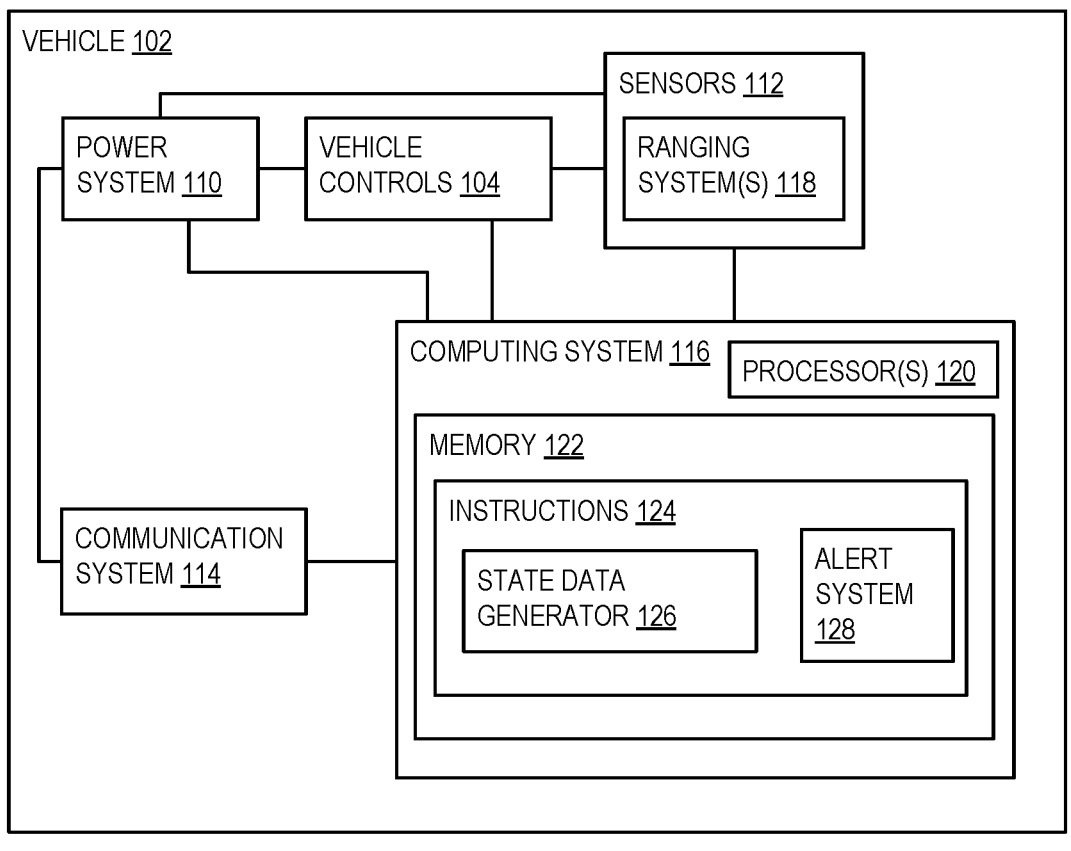
FIG. 6 is a block diagram of a system that enables monitoring of usage of vehicle controls of a vehicle and enables storage of state data during use of the vehicle to an external data recording system.

FIG. 6 is a block diagram of a system 600 including a vehicle 102 that enables monitoring of usage of vehicle controls 104 of the vehicle 102 and storage of state data during use of the vehicle 102 to an external data recording system 108. During operation of the vehicle 102, state data produced by a state data generator 126 of a computing system 116 of the vehicle 102 is sent to the communication system 114 for transmittal to the external data recording system 108.

Figure 7:
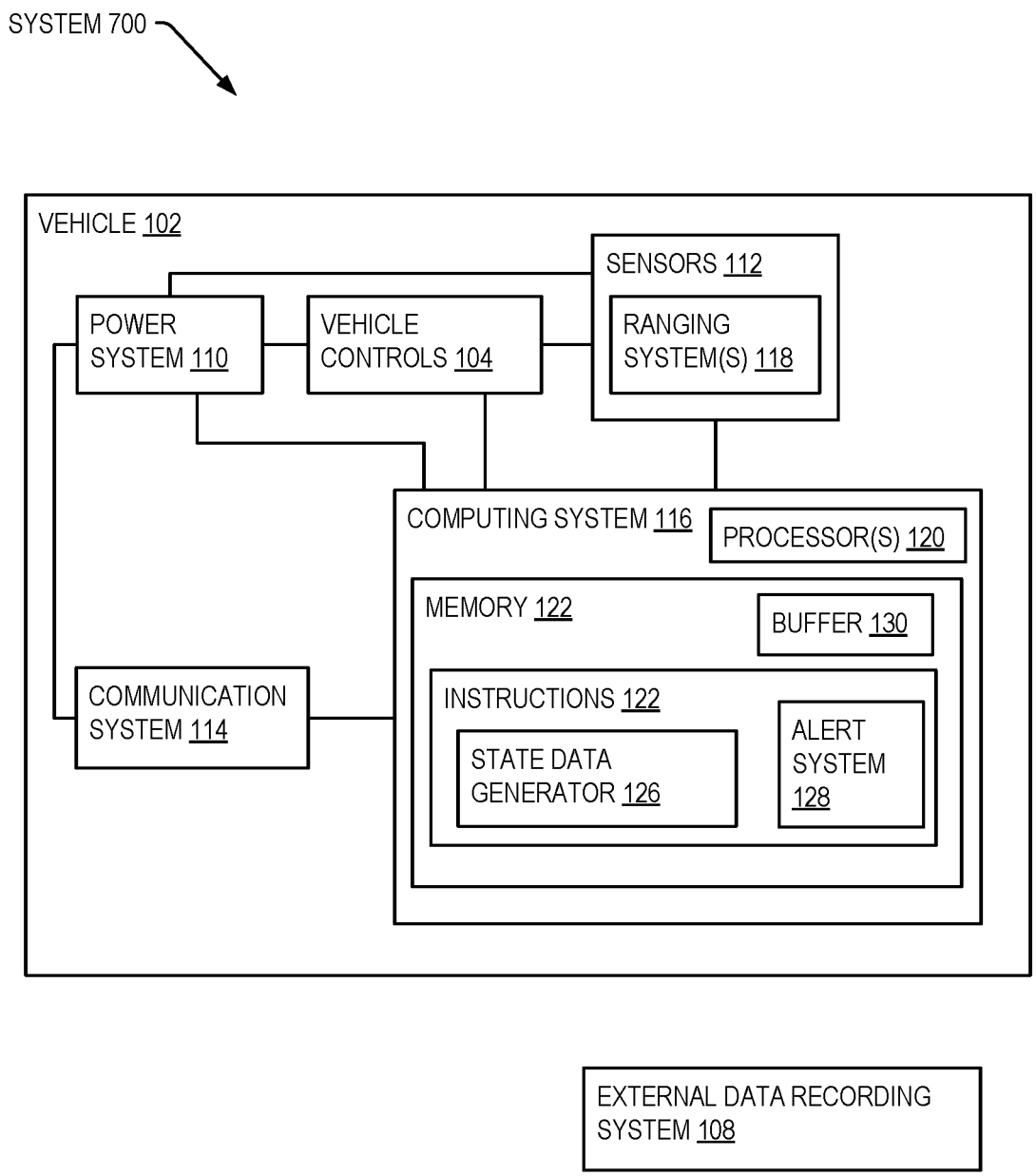
FIG. 7 is a block diagram of another system that enables monitoring of usage of vehicle controls of a vehicle and enables storage of state data during use of the vehicle to an external data recording system.

FIG. 7 is a block diagram of a system 700 including a vehicle 102 that enables monitoring of usage of vehicle controls 104 of the vehicle 102 and storage of state data during use of the vehicle 102 to an external data recording system 108. During operation of the vehicle 102, state data produced by a state data generator of a computing system 116 of is sent to a buffer 130 of the computing system 116. The content of the buffer 130 is periodically sent to the communication system 114 for transmittal to the external data recording system 108.

Figure 8:
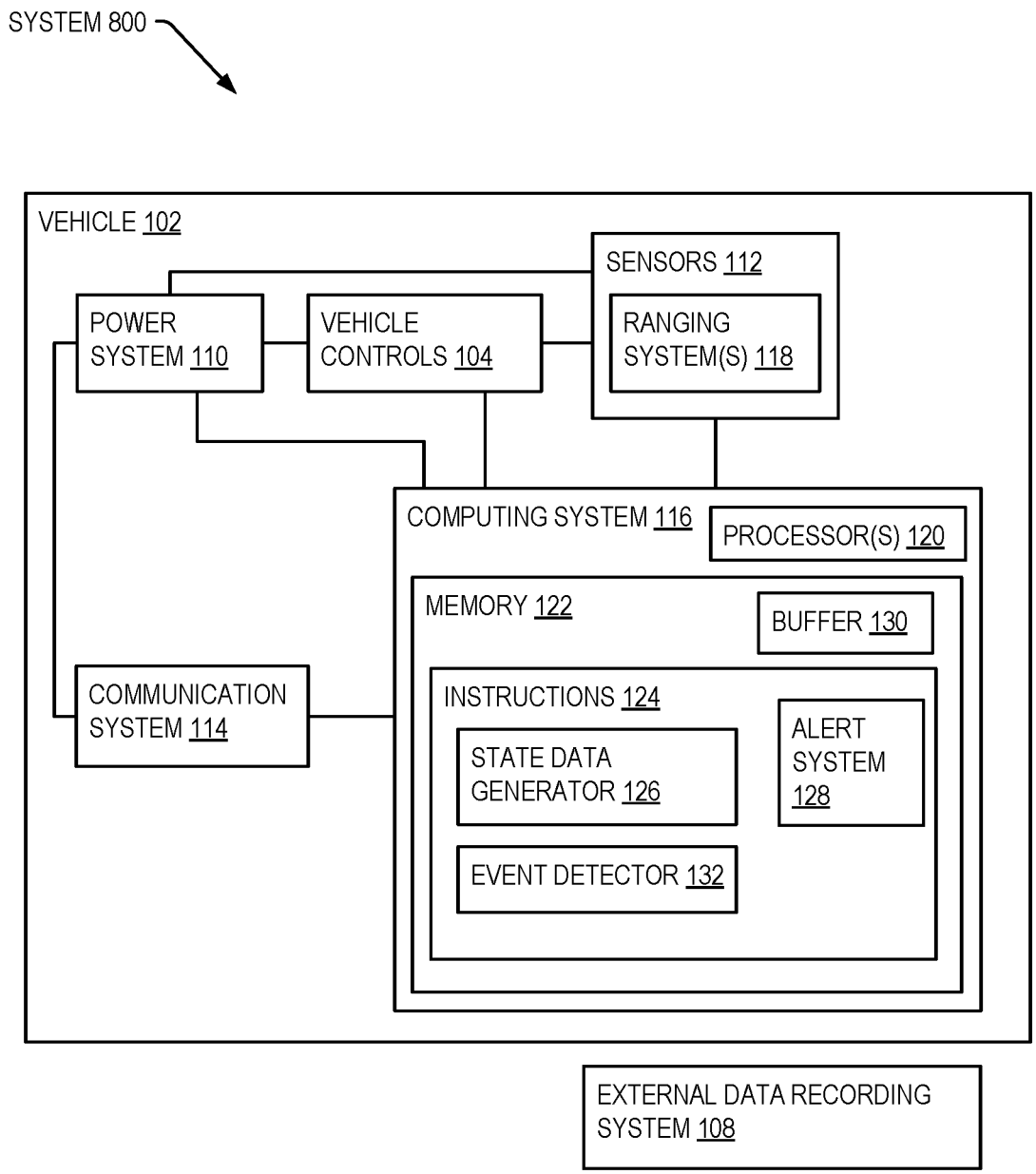
FIG. 8 is a block diagram of another system that enables monitoring of usage of vehicle controls of a vehicle and enables storage of state data during use of the vehicle to an external data recording system.

FIG. 8 is a block diagram of a system 800 including a vehicle 102 that enables monitoring of usage of vehicle controls 104 of the vehicle 102 and storage of state data during use of the vehicle 102 to an external data recording system 108. During operation of the vehicle 102, state data produced by a state data generator 126 is sent to, and saved in, a buffer 130 as a time window of state data associated with operation of the vehicle 102. In response to an event detector 132 of a computing system 116 detecting a start of an event, the event detector 132 causes the computing system 116 to send the state data content for the time window stored in the buffer 130 at a start of the event to a communication system 114 for transmittal to the external data recording system 108. The event detector 132 also causes newly generated state data produced by the state data generator 126 during the event to be sent, from the state data generator 126 or the buffer 130, to the communication system 114 for transmittal to the external data recording system 108.

Should the event detector 132 detect a start of a second event during a first event, the event detector 132 does not cause the state data content for the time window stored in the buffer 130 at the start of the second event to be sent to the communication system 114. When the vehicle 102 is concurrently experiencing a plurality of events, sending of current state data to the data recorder 106 continues until the event detector 132 determines based on event data input that all of the events of the plurality of events ended.

Figure 9:
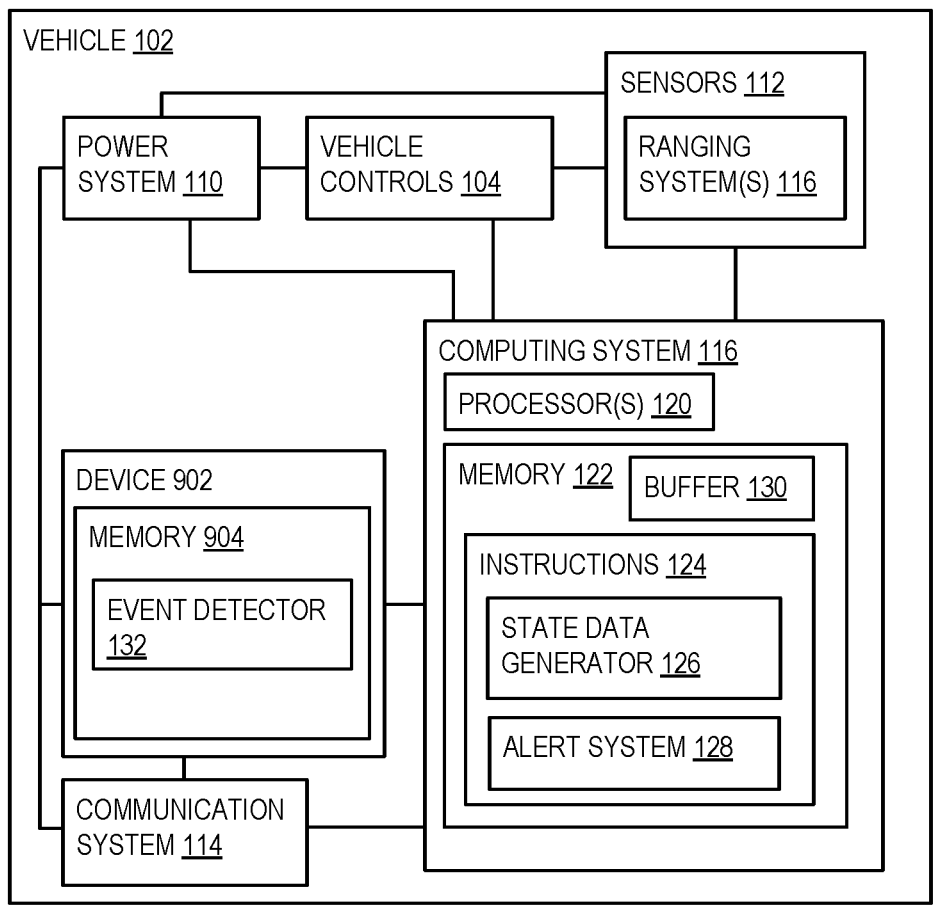
FIG. 9 is a block diagram of another system that enables monitoring of usage of vehicle controls of a vehicle and enables storage of state data during use of the vehicle to an external data recording system.

FIG. 9 is a block diagram of a system 900 including a vehicle 102 that enables monitoring of usage of vehicle controls 104 of the vehicle 102 and storage of state data during use of the vehicle 102 to an external data recording system 108. The vehicle 102 includes a device 902 separate from a computing system 116. The device 902 includes a memory 904. The memory 904 includes an event detector 132 that receives event detection data from the computing system 116, the communication system 114, other sources, or combinations thereof.

During operation of the vehicle 102, in response to the event detector 132 detecting a start of an event based on the event detection data, the event detector 132 causes the computing system 116 to send the state data content for the time window stored in the buffer 130 at a start of the event to a communication system 114 for transmittal to the external data recording system 108. The event detector 132 also causes newly generated state data to be sent to the communication system 114 from the state data generator 126 or the buffer 130 during the event for transmittal to the external data recording system 108.

Should the event detector 132 detect a start of a second event during a first event, the event detector 132 does not cause the state data content for the time window stored in the buffer 130 at the start of the second event to be sent to the communication system 114. When the vehicle 102 is concurrently experiencing a plurality of events, sending of current state data to the communication system 114 continues until the event detector 132 determines based on event data input that all of the events of the plurality of events ended.

Figure 10:
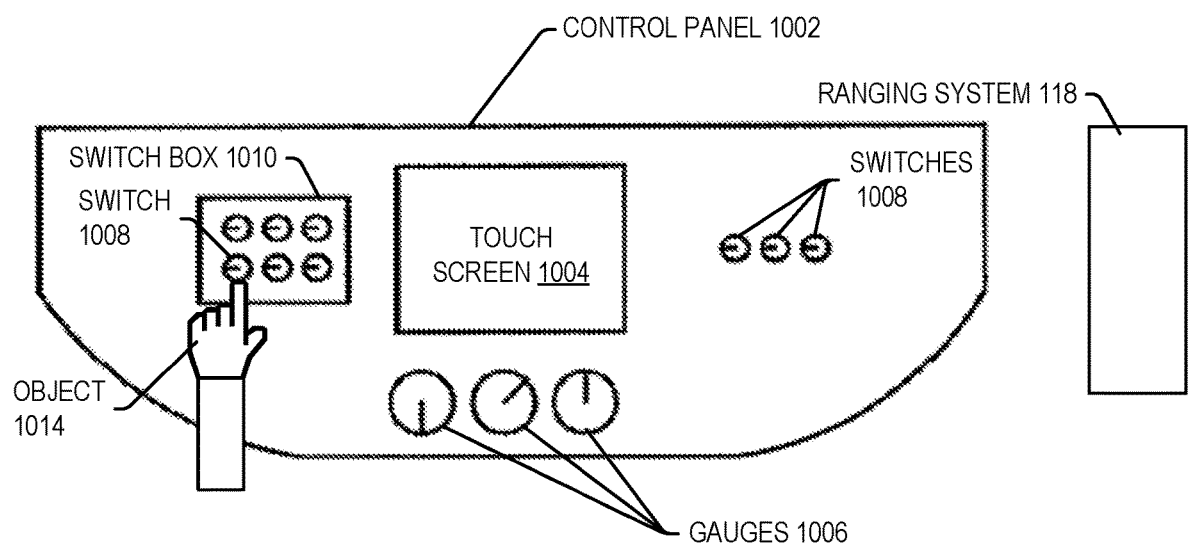
FIG. 10 is a representation of a control panel for a vehicle that is monitored by a ranging system.

FIG. 10 depicts a representation of a control panel 1002 for a vehicle (e.g., the vehicle 102 of FIGS. 1-9). The vehicle 102 can include several control panels including a main control panel and one or more auxiliary control panels. In the implementation depicted in FIG. 10, the control panel 1002 includes a touch screen 1004, gauges 1006 (e.g., an altimeter, air speed indicator, fuel gauge, etc.), switches 1008, and a switch box 1010 with switches 1008, and a ranging system 118 is located on a first side of the control panel 1002. In other implementations, a control panel can include additional types of controls (e.g., rotatable selectors, levers, knobs, slides, keys of a keyboard, etc.), fewer switches, more switches, no touch screen, one or more additional touch screens, no gauges, fewer gauges, additional gauges, or combinations thereof. The ranging system 118 depicted in FIG. 10 is positioned to monitor a space above the control panel 1002 without being positioned so that a camera of the ranging system 118 captures a face and body of an operator of the vehicle 102 that uses the control panel 1002. The ranging system 118 includes one or more detectors. The one or more detectors provide sensor data to a computing system (e.g., the computing system 116 of FIG. 1). The sensor data includes position data that indicates a position of one or more objects 1014 introduced into the space. The position data includes video data, point cloud data, or both. The position data indicates interaction of an operator of the vehicle 102 with one or more controls (e.g., with one or more of the touch screen 1004 or the switches 1008) of the vehicle 102 that are monitored by the ranging system 118.

Figure 11:
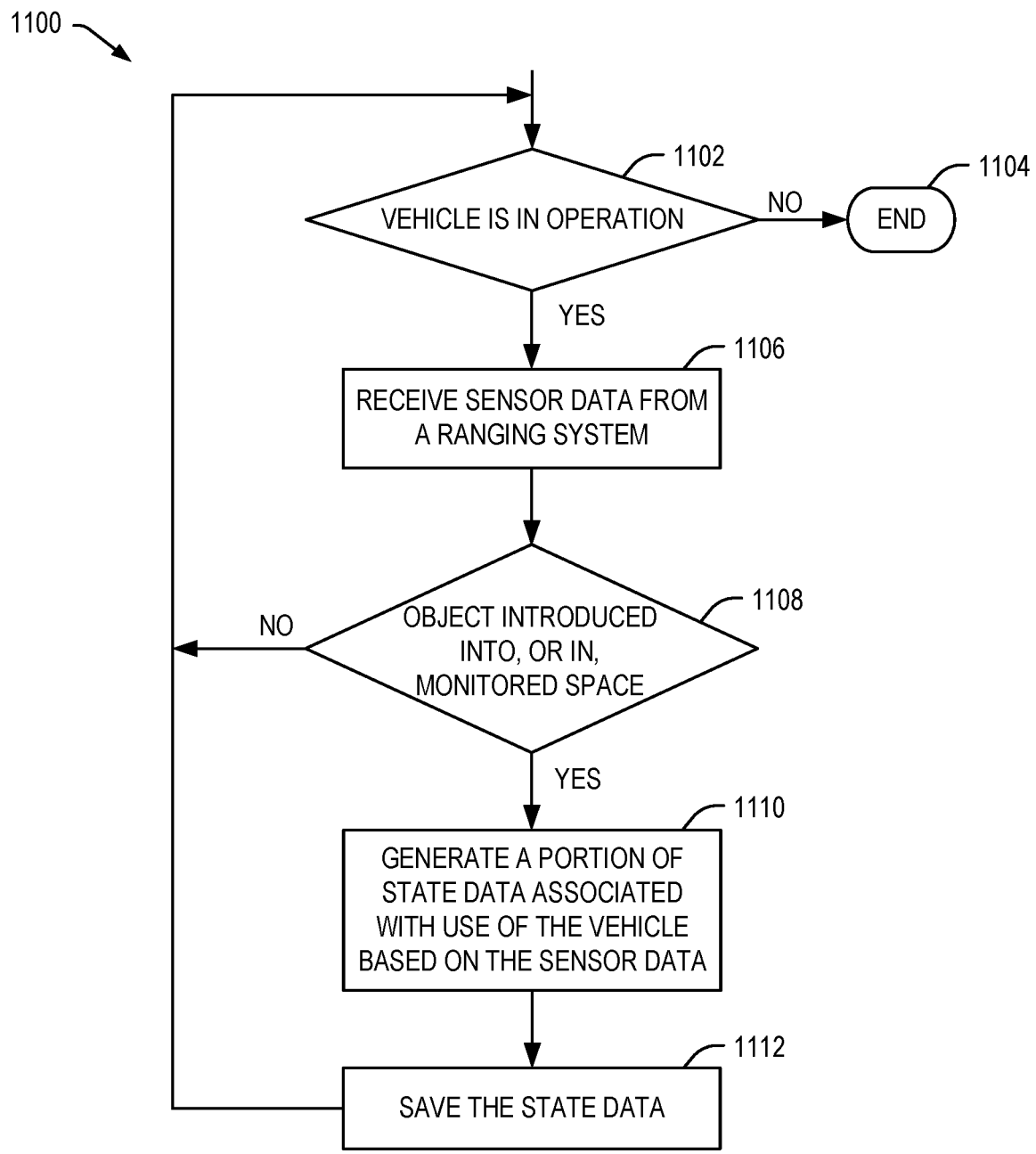
FIG. 11 depicts a flowchart of a method of use of a ranging system of one or more ranging systems of a vehicle.

FIG. 11 depicts a flow chart of a method 1100 of use of a ranging system of one or more ranging systems of a vehicle. The method 1100 is performed by the computing system 116 of any of FIGS. 1-9 based on sensor data received from a particular ranging system of one or more ranging systems 118. The method 1100, at decision block 1102, includes determining that the vehicle is in operation. In some implementations, the vehicle 102 is determined to be in operation when the vehicle 102 is powered from a power system 110 of the vehicle 102 or when the vehicle 102 is in on state such that the vehicle 102 is capable of self-propelled movement. When the determination at decision block 1102 is that the vehicle is not in operation, the method 1100 ends at block 1104.

When the determination at decision block 1102 is that the vehicle is in operation, the method 1100, at block 1106 includes receiving sensor data from the ranging system. The ranging system is a sensor 112 of the vehicle that provides sensor data to the computing system 116.

The method 1100, at decision block 1108, includes determining whether an object is introduced into, or is currently in, a space monitored by the ranging system. For example, the computing system 116 determines whether the object 1014 depicted in FIG. 10 is introduced into the space monitored by the ranging system 118, or whether the object 1014 remains in the space monitored by the ranging system 118 after having been introduced into the space. When the determination at decision block 1108 is that the object is not introduced into the space, or is not currently in the space, the method 1100 returns to decision block 1102.

When the determination at decision block 1108 is that the object is introduced into the space, or is currently in the space, the method 1100, at block 1110, includes generating a portion of state data associated with the use of the vehicle based on the sensor data. The portion of state data includes point cloud data descriptive of one or more boundaries of the object 1014 or video data of the space. The portion of the state data can be subsequently used to determine whether the object interacted with one or more vehicle controls 104 of the vehicle 102 in the space.

The method 1100 includes, at block 1112, saving the state data. For example, the state data is saved to a buffer 130, a data recorder 106, an external data recording system 108, or combinations thereof. The method 1100 then returns to decision block 1102.

Figure 12:
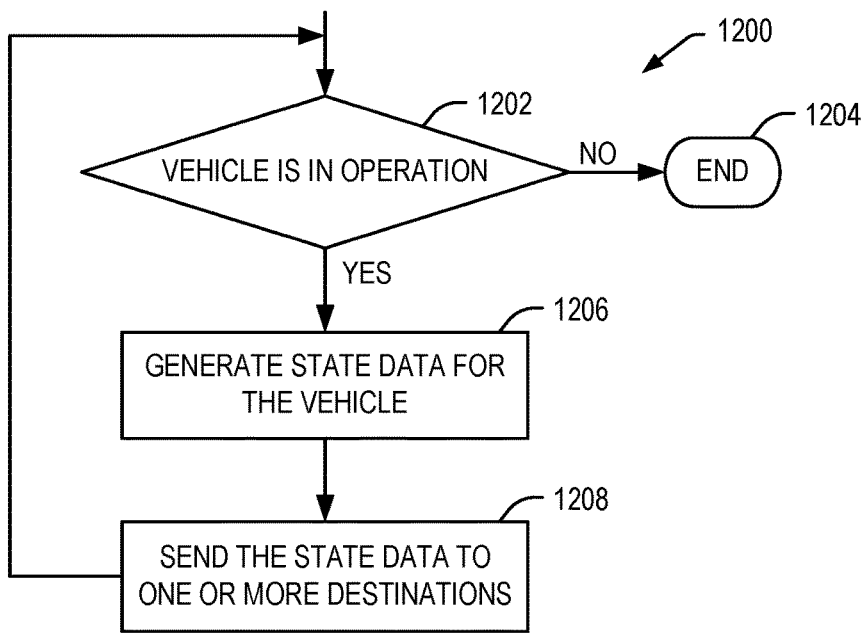
FIG. 12 depicts a flow chart of a method of saving vehicle state data during use of a vehicle.

FIG. 12 depicts a flow chart of a method 1200 of saving vehicle state data during use of a vehicle. The method 1200 is performed by the computing system 116 of FIG. 1 or the computing system 116 of FIG. 6. The method 1200, at decision block 1202, includes determining that the vehicle is in operation. In some implementations, the vehicle 102 is determined to be in operation when the vehicle 102 is powered from a power system 110 of the vehicle 102 or when the vehicle 102 is in on state such that the vehicle 102 is capable of self-propelled movement. When the determination at decision block 1202 is that the vehicle is not in operation, the method 1200 ends at block 1204.

When the determination at decision block 1102 is that the vehicle is in operation, the method 1200, at block 1206, includes generating state data for the vehicle. For example, a state data generator 126 of the computing system 116 produces state data associated with operation of the vehicle 102. The state data indicates settings, operating conditions, and other information associated with use of the vehicle 102. The state data generator 126 of the computing system 116 generates, accesses, and organizes state data associated with operation of the vehicle 102. The state data includes information associated with use by an operator of the vehicle 102 of one or more vehicle controls 104. For example, the state data includes point cloud information or video data from one or more ranging systems 118 when an operator of the vehicle 102 uses a finger to change a vehicle control 104 in a space monitored by the ranging system 118.

The method 1200 at block 1208, includes sending the state data to one or more destinations. In the implementation of FIG. 1, the one or more destinations include the data recorder 106, the external data recording system 108 via the communication system 114, or both. In the implementation of FIG. 6, the destination is the external data recording system 108 via the communication system 114. The method 1200 then returns to decision block 1202.

Figure 13:
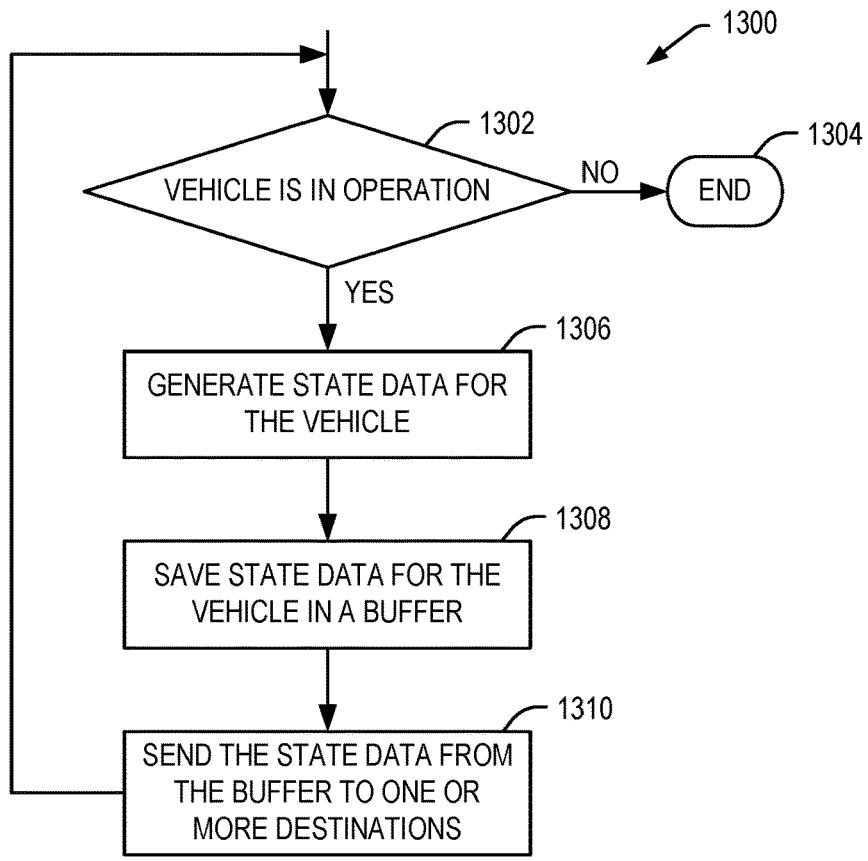
FIG. 13 depicts a flow chart of another method of saving vehicle state data during use of a vehicle.

FIG. 13 depicts a flow chart of a method 1300 of saving vehicle state data during use of a vehicle. The method 1300 is performed by the computing system 116 of FIG. 2 or the computing system 116 of FIG. 7. The method 1300, at decision block 1302, includes determining that the vehicle is in operation. In some implementations, the vehicle 102 is determined to be in operation when the vehicle 102 is powered from a power system 110 of the vehicle 102 or when the vehicle 102 is in on state such that the vehicle 102 is capable of self-propelled movement. When the determination at decision block 1302 is that the vehicle is not in operation, the method 1300 ends at block 1304.

When the determination at decision block 1302 is that the vehicle is in operation, the method 1300, at block 1306, includes generating state data for the vehicle. For example, a state data generator 126 of the computing system 116 produces state data associated with operation of the vehicle 102. The state data indicates settings, operating conditions, and other information associated with use of the vehicle 102.

The method 1300 at block 1308, includes saving the state data for the vehicle in a buffer. For example, state data produced by a state data generator 126 of the computing system 116 is stored to a buffer 130.

The method 1300 at block 1310, includes sending the state data from the buffer to one or more destinations. In the implementation of FIG. 2, the one or more destinations include the data recorder 106, the external data recording system 108 via the communication system 114, or both. In the implementation of FIG. 7, the destination is the external data recording system 108 via the communication system 114. The method 1200 then returns to decision block 1202.

Figure 14:
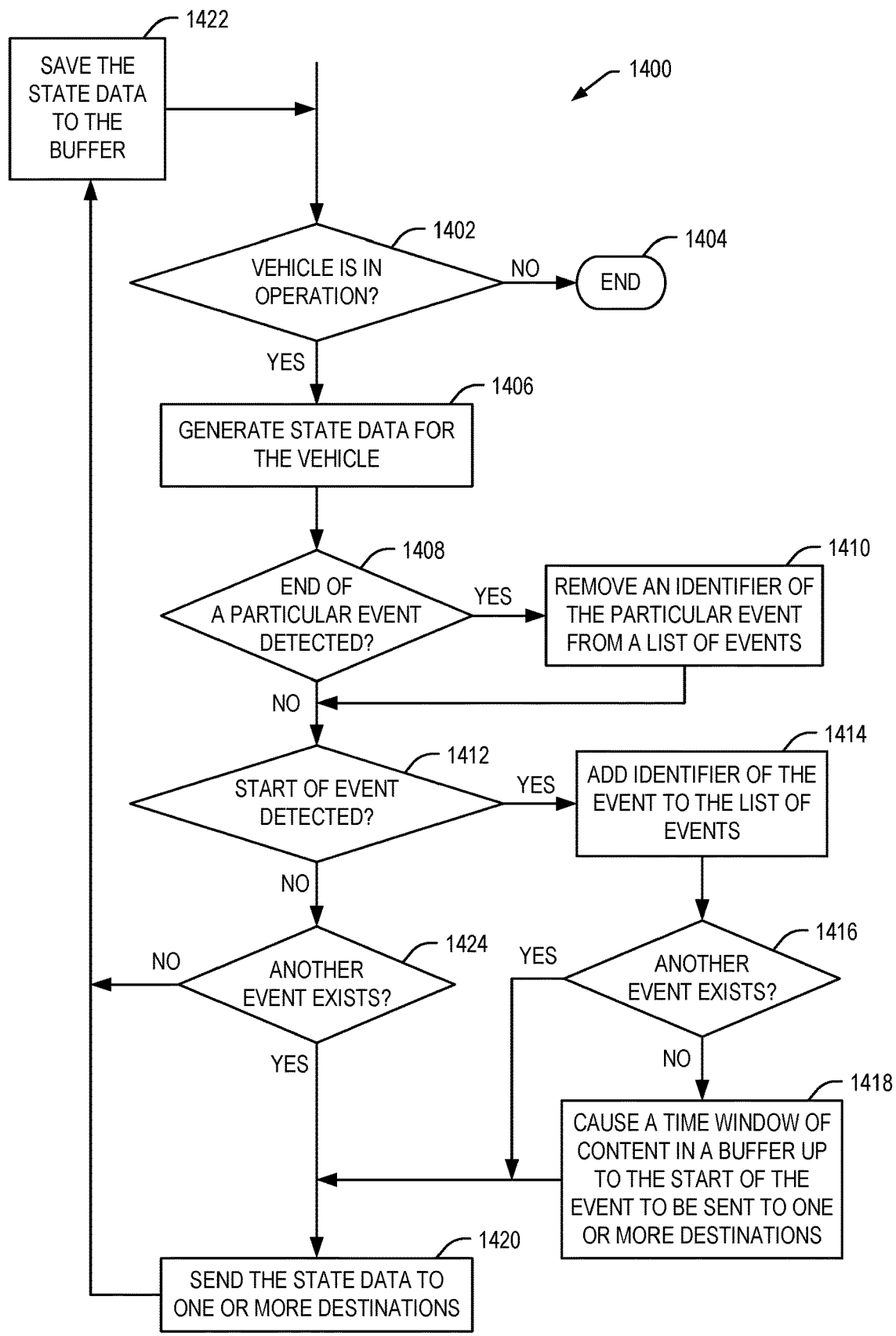
FIG. 14 depicts a flow chart of another method of saving vehicle state data during use of a vehicle.

FIG. 14 depicts a flow chart of a method 1400 of saving vehicle state data during use of a vehicle. The method 1300 is performable by devices (e.g., the computing systems 116, the device 402, the device 902, the data recorder 106, or combinations thereof) of vehicles 102 of FIGS. 1-9. The method 1400 saves state data to a data recorder 106 onboard the vehicle 102, to an external data recording system 108 offboard the vehicle 102, or both, in response to detection of an event during operation of the vehicle 102. The method 1400, at decision block 1402, includes determining that the vehicle is in operation. In some implementations, the vehicle 102 is determined to be in operation when the vehicle 102 is powered from a power system 110 of the vehicle 102 or when the vehicle 102 is in on state such that the vehicle 102 is capable of self-propelled movement. When the determination at decision block 1402 is that the vehicle is not in operation, the method 1400 ends at block 1404.

When the determination at decision block 1402 is that the vehicle is in operation, the method 1400, at block 1406 includes generating state data for the vehicle. The state data is generated by the state data generator 126 of the computing system 116.

The method 1400, at decision block 1408, determines whether an end of a particular event is detected. For example, the event detector 132, based on event data input or a lack of event data input, determines whether a particular event ends or continues to exist. The computing system 116 tracks existing events by use of an event list that includes a unique identifier associated with each existing event. When the determination at decision block 1408 is that an end of a particular event is detected, the method 1400, at block 1410, includes removing an identifier of the particular event from the list of events. The method 1400 then proceeds to decision block 1412.

When the determination at decision block 1408 is that end of a particular event is not detected, the method 1400, also proceeds to decision block 1412. The method 1400, at decision block 1412, includes determining whether a start of an event is detected. For example, the event detector 132, based on event data input, determines whether operator input, input received via the communication system 114 from an external source, conditions, or other information indicate a start of an event based on satisfaction of particular rules and conditions. When the determination at decision block 1412 is that the start of the event is detected, the method 1400, at block 1414, includes adding a unique identifier of the event to the list of events. The method 1400 then proceeds to decision block 1416.

The method 1400, at decision block 1416, includes determining whether another event exists. Another event exists when there is at least one additional entry in the list of events in addition to the entry for the event. When the determination at decision block 1416 is that there is not another existing event, the method 1400, at block 1418, includes causing all or a portion of a time window of content in a buffer up to the start of the event to be sent to one or more destinations. For example, the event detector 132 causes the time window of content in the buffer 130 to be sent to the data recorder 106, the external data recording system 108 via the communication system 114 of the vehicle 102, or both. The method 1400 then proceeds to block 1420.

When the determination at decision block 1416 is that another event exists, the method 1400 also proceeds to block 1420. The method 1400, at block 1420, includes sending the state data to one or more destinations. The one or more destinations include the data recorder 106, the external data recording system 108 via the communication system 114 of the vehicle 102, or both. For example, the event detector 132 causes the state data to be sent to the data recorder 106, the external data recording system 108 via the communication system 114 of the vehicle 102, or both. The method 1400 then proceeds to block 1422.

The method 1400, at block 1422, includes saving the state data to the buffer. For example the state data is saved to the buffer 130. The method 1400, then returns to decision block 1402.

When the determination at decision block 1412 is that a start of an event is not detected, the method 1400, at decision block 1424, includes determining whether another event exists. Another event exists when there is at least one additional entry in the list of events in addition to the entry for the event. When the determination at decision block 1424 is that there is not another existing event, the method proceeds to block 1422. When the determination at decision block 1424 is that there is another existing event, the method proceeds to block 1420.

Figure 15:
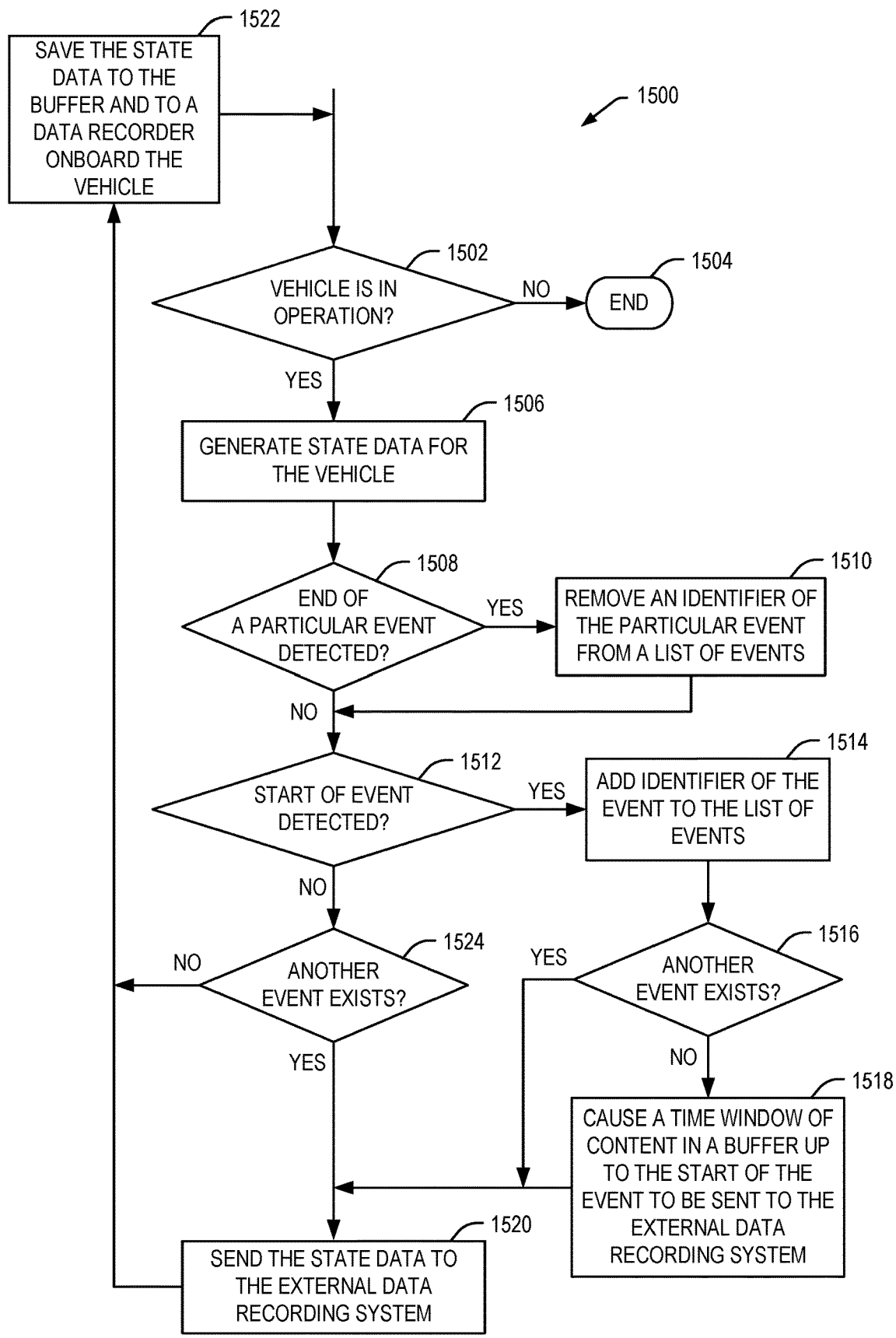
FIG. 15 depicts a flow chart of another method of saving vehicle state data during use of a vehicle.

FIG. 15 depicts a flow chart of a method 1500 of saving vehicle state data during use of a vehicle. The method 1500 is performable by devices (e.g., the computing systems 116, the device 402, the data recorder 106, or combinations thereof) of vehicles 102 of FIGS. 1-5. The method 1500 saves state data to a data recorder 106 onboard the vehicle 102 during use of the vehicle, and transmits state data to the external data recording system 108 in response to detection of an event. The method 1500, at decision block 1502, includes determining that the vehicle is in operation. In some implementations, the vehicle 102 is determined to be in operation when the vehicle 102 is powered from a power system 110 of the vehicle 102 or when the vehicle 102 is in a state such that the vehicle 102 is capable of self-propelled movement. When the determination at decision block 1502 is that the vehicle is not in operation, the method 1500 ends at block 1504.

When the determination at decision block 1502 is that the vehicle is in operation, the method 1500, at block 1506 includes generating state data for the vehicle. For example, the state data is generated by the state data generator 126 of the computing system 116.

The method 1500, at decision block 1508, determines whether an end of a particular event is detected. For example, the event detector 132, based on event data input or a lack of event data input, determines whether a particular event ends or continues to exist. The computing system 116 tracks existing events by use of an event list that includes a unique identifier associated with each existing event. When the determination at decision block 1508 is that an end of a particular event is detected, the method 1500, at block 1510, includes removing an identifier of the particular event from the list of events. The method 1500 then proceeds to decision block 1512.

When the determination at decision block 1508 is that end of a particular event is not detected, the method 1500, also proceeds to decision block 1512. The method 1500, at decision block 1512, includes determining whether a start of an event is detected. For example, the event detector 132, based on event data input, determines whether operator input, input received via the communication system 114 from an external source, conditions, or other information indicate a start of an event based on satisfaction of particular rules and conditions. When the determination at decision block 1512 is that the start of the event is detected, the method 1500, at block 1514, includes adding a unique identifier of the event to the list of events. The method 1500 then proceeds to decision block 1516.

The method 1500, at decision block 1516, includes determining whether another event exists. Another event exists when there is at least one additional entry in the list of events in addition to the entry for the event. When the determination at decision block 1516 is that there is not another existing event, the method 1500, at block 1518, includes causing all or a portion of a time window of content in a buffer up to the start of the event to be sent to an external data recording system. For example, the event detector 132 causes the time window of content in the buffer 130 to be sent to the communication system 114 for transmittal to the external data recording system 108. The method 1500 then proceeds to block 1520.

When the determination at decision block 1516 is that another event exists, the method 1500 also proceeds to block 1520. The method 1500, at block 1520, includes sending the state data to the external data recording system. For example, the event detector 132 causes the state data to be sent to the external data recording system 108 via the communication system 114 of the vehicle 102. The method 1500 then proceeds to block 1522.

The method 1500, at block 1522, includes saving the state data to the buffer and to a data recorder onboard the vehicle. For example the state data is saved to the buffer 130 and to the data recorder 106 onboard the vehicle 102. The method 1500, then returns to decision block 1502.

When the determination at decision block 1512 is that a start of an event is not detected, the method 1500, at decision block 1524, includes determining whether another event exists. Another event exists when there is at least one additional entry in the list of events in addition to the entry for the event. When the determination at decision block 1524 is that there is not another existing event, the method proceeds to block 1522. When the determination at decision block 1524 is that there is another existing event, the method proceeds to block 1520.

Figure 16:
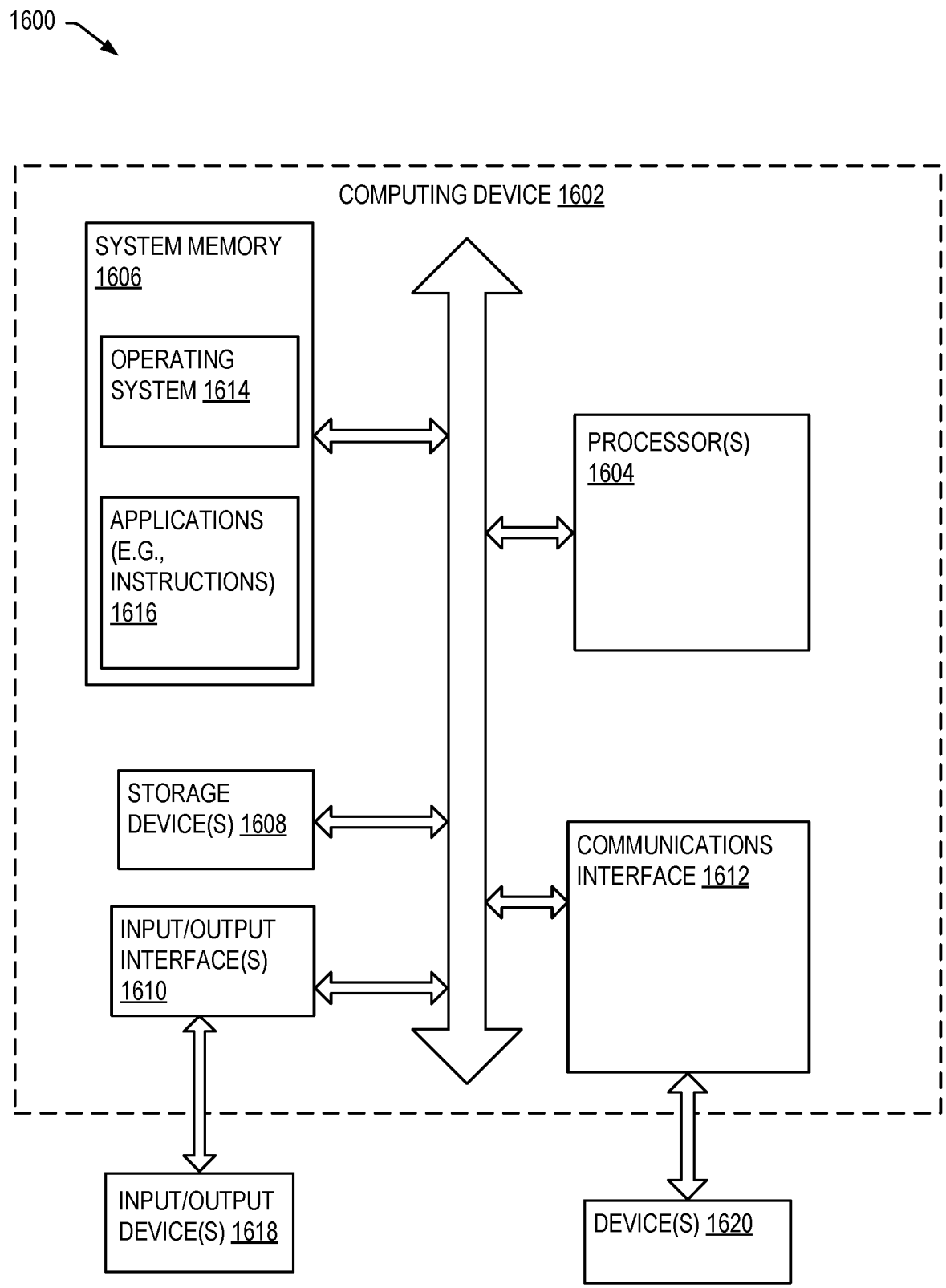
FIG. 16 is a diagram of a representation of a computing system.

FIG. 16 is an illustration of a block diagram of a computing environment 1600 including a general purpose computing device 1602 configured to support implementations of computer-implemented methods and computer-executable program instructions (or code) according to the present disclosure. For example, the computing device 1602, or portions thereof, may execute instructions to perform, or cause equipment to perform, operations described with reference to FIGS. 1-15. In an implementation, the computing device 1602 is, or is a component of, the vehicle 102, the external data recording system 108, the sensors 112, the data recorder 106, the communication system 114, the computing system 116, or combinations thereof.

The computing device 1602 includes a processor 1604. In an implementation, the processor 1604 includes the one or more processors 120 of FIG. 1-9. The processor 1604 communicates with a system memory 1606, one or more storage devices 1608, one or more input/output interfaces 1610, one or more communications interfaces 1612, or a combination thereof. The system memory 1606 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 1606 includes an operating system 1614, which may include a basic input/output system for booting the computing device 1602 as well as a full operating system to enable the computing device 1602 to interact with users, other programs, and other devices. The system memory 1606 includes one or more applications 1616 (e.g., instructions) which are executable by the processor 1604. In an implementation, the system memory 1606 and the one or more storage devices 1608 include the memory 122 of FIG. 1-9, the memory 404 of FIG. 4, and the memory 904 of FIG. 9.

The processor 1604 communicates with the one or more storage devices 1608. For example, the one or more storage devices 1608 are non-transitory computer readable media that can include nonvolatile storage devices, such as magnetic disks, optical disks, or flash memory devices. The storage devices 1608 can include both removable and non-removable memory devices. The storage devices 1608 can be configured to store an operating system, images of operating systems, applications, and program data. In particular implementations, the system memory 1606, the storage devices 1608, or both, include tangible computer-readable media incorporated in hardware and which are not signals.

The processor 1604 communicates with the one or more input/output interfaces 1610 that enable the computing device 1602 to communicate with one or more input/output devices 1618 to facilitate user interaction. The input/output interfaces 1610 can include serial interfaces (e.g., universal serial bus (USB) interfaces or Institute of Electrical and Electronics Engineers (IEEE) 1364 interfaces), parallel interfaces, display adapters, audio adapters, and other interfaces. The input/output devices 1618 can include keyboards, pointing devices, displays (e.g., one or more monitors, one or more gauges, etc.), speakers, microphones, touch screens, rotatable selectors, levers, knobs, slides, switches, and other devices. The processor 1604 detects interaction events based on user input received via the input/output interfaces 1610. Additionally, the processor 1604 sends a display to a display device via the input/output interfaces 1610. In some implementations, the input/output devices 1618 include the touch screen 1004, the gauges 1006, and the switches 1008 of the control panel 1002 of FIG. 10.

The processor 1604 can communicate with one or more devices 1620 via the one or more communications interfaces 1612. The one or more devices 1620 can include external computing devices contacted via a communication network and controllers, sensors, and other devices coupled to the computing device 1602 via wired or wireless local connections. The one or more communications interfaces 1612 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

Aspects of the disclosure are described further with reference to the following set of interrelated clauses:

According to Clause 1, a method of monitoring vehicle controls of a vehicle includes: receiving, at a computing system, sensor data from a ranging system, wherein the ranging system monitors a space associated with one or more vehicle controls; and causing the computing system to save first state data to a first memory onboard the vehicle, wherein, in response to a determination by the computing system that one or more objects are introduced into the space based on analysis of the sensor data, the first state data includes position data indicating a position of the one or more objects in the space.

Clause 2 includes the method of Clause 1, and further includes transmitting second state data to enable storage of the second state data to an external data storage system.

Clause 3 includes the method of Clause 1 or Clause 2, wherein the one or more objects comprise one or more fingers, a thumb, or both, of an operator of the vehicle.

Clause 4 includes the method of any of Clauses 1 to 3, wherein the vehicle is an aircraft, and wherein the first memory comprises a portion of a flight recorder system.

Clause 5 includes the method of any of Clauses 1 to 4, wherein the position data comprises video data of the space.

Clause 6 includes the method of Clause 5, wherein the ranging system is positioned to avoid inclusion of a face of an operator of the vehicle in the video data.

Clause 7 includes the method of any of Clauses 1 to 6, wherein the position data comprises point cloud data that defines one or more boundaries of the one or more objects in the space.

Clause 8 includes the method of any of Clauses 1 to 8, and further includes, in response to detection of an event, causing the computing system to transmit second state data to an external data recording system.

Clause 9 includes the method of Clause 8, wherein detection of the event is based on input from an operator of the vehicle.

Clause 10 includes the method of Clause 8, wherein detection of the event is based on input received from an external source via a communication system of the vehicle.

According to Clause 11, a system to monitor vehicle controls of a vehicle includes: a ranging system configured to monitor a space associated with one or more vehicle controls; one or more processors coupled to the ranging system and configured to receive sensor data from the ranging system, wherein the one or more processors are further configured to generate first state data, and wherein, in response to a determination by the one or more processors that one or more objects are introduced into the space based on analysis of the sensor data, the first state data includes position data that indicates a position of the one or more objects in the space; and a first memory configured to store the first state data.

Clause 12 includes the system of Clause 11, wherein the position data indicates interaction of an operator with one or more particular vehicle controls of the one or more vehicle controls.

Clause 13 includes the system of Clause 11 or Clause 12, and further includes a communication system, wherein the communication system is configured to transmit second state data for storage in an external data recording system.

Clause 14 includes the system of Clauses 13, wherein the one or more processors are further configured to detect a start of an event based on information from an alert system of the vehicle, and wherein the one or more processors are further configured to transmit the second state data via the communication system responsive to detection of the start of the event.

Clause 15 includes the system of Clause 13, wherein the one or more processors are further configured to detect a start of an event based on content received via the communication system, and wherein the one or more processors are further configured to transmit the second state data via the communication system responsive to detection of the start of the event.

According to Clause 16, a vehicle includes: vehicle controls; a ranging system positioned in working relation to the vehicle controls, wherein the ranging system is configured to monitor a space associated with the vehicle controls; a computing system coupled to the ranging system and configured to receive sensor data from the ranging system, wherein the computing device is further configured to generate first state data, and wherein, in response to a determination by the computing device that one or more objects are introduced into the space based on analysis of the sensor data, the first state data includes position data that indicates a position of the one or more objects in the space; and a first memory configured to store the first state data.

Clause 17 includes the vehicle of Clause 16, and further includes a communication system, wherein the communication system is configured to transmit second state data to enable storage of the second state data in an external data recording system.

Clause 18 includes the vehicle of Clause 17, wherein the computing device is further configured to detect a start of an event based on information from an alert system of the vehicle, and wherein the computing device is further configured to transmit the second state data via the communication system in response to detection of the start of the event.

Clause 19 includes the vehicle of Clause 17, wherein the computing device is further configured to detect a start of an event based on information received via the communication system, and wherein the computing device is further configured to transmit the second state data via the communication system in response to detection of the start of the event.

Clause 20 includes the vehicle of Clause 19, wherein the computing device is further configured to detect an end of the event, and wherein the computing device is further configured to end transmission of the second state data via the communication system in response to detection of the end of the event.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of monitoring vehicle controls of a vehicle, the method comprising:
    receiving, at a computing system, sensor data from a ranging system, wherein the ranging system monitors a space associated with one or more vehicle controls;
    receiving, at the computing system, second sensor data from a control sensor, wherein the control sensor monitors a second vehicle control distinct from the one or more vehicle controls;
    causing the computing system to save first state data to a first memory onboard the vehicle, wherein the first state data includes control data identifying one or more inputs received via the second vehicle control, wherein, in response to a determination by the computing system that one or more objects are introduced into the space based on analysis of the sensor data, the first state data includes position data indicating a position of the one or more objects in the space, and wherein the position data is generated by manipulating the sensor data from the ranging system to identify the position of the one or more objects;
    activating a third sensor of the ranging system responsive to the determination by the computing system that the one or more objects are introduced into the space, wherein the sensor data includes an output from the third sensor responsive to the third sensor being activated; and
    deactivating the third sensor responsive to a second determination by the computing system that the one or more objects are removed from the space.

2. The method of claim 1, wherein the one or more vehicle controls includes a touch screen, a switch, a rotatable selector, a lever, a knob, a slide, a keyboard, or a combination thereof, and wherein the second vehicle control comprises a steering yoke.

3. The method of claim 1, wherein causing the computing system to save the first state data includes saving buffer data of a buffer storing buffered position data of the one or more objects in response to the determination by the computing system that the one or more objects are introduced into the space.

4. The method of claim 1, wherein manipulating the sensor data includes cropping the sensor data to remove data corresponding to outside the space associated with the one or more vehicle controls.

5. The method of claim 1, wherein the position data comprises video data of the space.

6. The method of claim 5, wherein the ranging system is positioned to avoid inclusion of a face of an operator of the vehicle in the video data.

7. The method of claim 1, wherein the position data comprises point cloud data that defines one or more boundaries of the one or more objects in the space.

8. The method of claim 1, further comprising, in response to detection of an event, causing the computing system to transmit second state data to an external data recording system.

9. The method of claim 8, wherein detection of the event is based on input from an operator of the vehicle.

10. The method of claim 8, wherein detection of the event is based on input received from an external source.

11. A system to monitor vehicle controls of a vehicle, the system comprising:
    a ranging system configured to monitor a space associated with one or more vehicle controls;
    one or more processors coupled to the ranging system and configured to:
        receive sensor data from the ranging system;
        receive second sensor data from a control sensor, wherein the control sensor monitors a second vehicle control distinct from the one or more vehicle controls, wherein the one or more processors are further configured to generate first state data, wherein the first state data includes control data identifying one or more inputs received via the second vehicle control, wherein, in response to a determination by the one or more processors that one or more objects are introduced into the space based on analysis of the sensor data, the first state data includes position data that indicates a position of the one or more objects in the space, and wherein the position data is generated by manipulating the sensor data from the ranging system to identify the position of the one or more objects;

activate a third sensor of the ranging system responsive to the determination by the one or more processors that the one or more objects are introduced into the space, wherein the sensor data includes an output from the third sensor responsive to the third sensor being activated; and deactivate the third sensor responsive to a second determination by the one or more processors that the one or more objects are removed from the space; and a first memory configured to store the first state data.

12. The system of claim 11, wherein the position data indicates interaction of an operator with one or more particular vehicle controls of the one or more vehicle controls.

13. The system of claim 11, wherein the one or more processors are further configured to initiate transmission of second state data for storage in an external data recording system.

14. The system of claim 13, wherein the one or more processors are further configured to detect a start of an event based on information from an alert system of the vehicle, and wherein the one or more processors are further configured to send the second state data responsive to detection of the start of the event.

15. The system of claim 13, wherein the one or more processors are further configured to detect a start of an event based on content received from an external source, and wherein the one or more processors are further configured to transmit the second state data responsive to detection of the start of the event.

16. A vehicle comprising:
one or more vehicle controls;
a ranging system positioned in working relation to the one or more vehicle controls, wherein the ranging system is configured to monitor a space associated with the one or more vehicle controls;
a computing system coupled to the ranging system and configured to:
receive sensor data from the ranging system;
receive second sensor data from a control sensor, wherein the control sensor monitors a second vehicle control distinct from the one or more vehicle controls, wherein the computing system is further configured to generate first state data, wherein the first state data includes control data identifying one or more inputs received via the second vehicle control, wherein, in response to a determination by the computing system that one or more objects are introduced into the space based on analysis of the sensor data, the first state data includes position data that indicates a position of the one or more objects in the space, and wherein the position data is generated by manipulating the sensor data from the ranging system to identify the position of the one or more objects;

activate a third sensor of the ranging system responsive to the determination by the computing system that the one or more objects are introduced into the space, wherein the sensor data includes an output from the third sensor responsive to the third sensor being activated; and deactivate the third sensor responsive to a second determination by the computing system that the one or more objects are removed from the space; and a first memory configured to store the first state data.

17. The vehicle of claim 16, wherein the computing system is further configured to initiate transmission of second state data to enable storage of the second state data in an external data recording system.

18. The vehicle of claim 17, wherein the computing system is further configured to detect a start of an event based on information from an alert system of the vehicle, and wherein the computing system is further configured to transmit the second state data in response to detection of the start of the event.

19. The vehicle of claim 17, wherein the computing system is further configured to detect a start of an event based on information received from an external source, and wherein the computing system is further configured to transmit the second state data in response to detection of the start of the event.

20. The vehicle of claim 19, wherein the computing system is further configured to detect an end of the event, and wherein the computing system is further configured to end transmission of the second state data in response to detection of the end of the event.

* * * * *